(12) United States Patent
Xu et al.

(10) Patent No.: US 11,525,980 B2
(45) Date of Patent: Dec. 13, 2022

(54) CAMERA LENS GROUP

(71) Applicant: Zhejiang Sunny Optical Co., Ltd., Ningbo (CN)

(72) Inventors: Wuchao Xu, Ningbo (CN); Yuanlin Jia, Ningbo (CN)

(73) Assignee: Zhejiang Sunny Optical Co., Ltd.

( * ) Notice: Subject to any disclaimer, the term of this patent is extended or adjusted under 35 U.S.C. 154(b) by 315 days.

(21) Appl. No.: 16/854,383

(22) Filed: Apr. 21, 2020

(65) Prior Publication Data

US 2020/0249441 A1 Aug. 6, 2020

Related U.S. Application Data

(63) Continuation of application No. PCT/CN2018/116310, filed on Nov. 20, 2018.

(30) Foreign Application Priority Data

Jun. 5, 2018 (CN) .......................... 201810566935.4

(51) Int. Cl.
*G02B 9/60* (2006.01)
*G02B 13/00* (2006.01)
*G02B 27/00* (2006.01)

(52) U.S. Cl.
CPC ........... *G02B 9/60* (2013.01); *G02B 13/0045* (2013.01); *G02B 27/0025* (2013.01)

(58) Field of Classification Search
None
See application file for complete search history.

(56) References Cited

U.S. PATENT DOCUMENTS

| 10,830,994 B2 * | 11/2020 | Nakai ................. G02B 13/006 |
| 2007/0139793 A1 | 6/2007 | Kawada |
| 2010/0142062 A1 | 6/2010 | Asami et al. |
| 2011/0273611 A1 | 11/2011 | Matsusaka et al. |

(Continued)

FOREIGN PATENT DOCUMENTS

| CN | 201278039 Y | 7/2009 |
| CN | 103048772 A | 4/2013 |

(Continued)

OTHER PUBLICATIONS

International Search Report for Application PCT/CN2018/116310 dated Feb. 27, 2019, 3 pages.

(Continued)

*Primary Examiner* — Darryl J Collins
(74) *Attorney, Agent, or Firm* — Barnes & Thornburg LLP

(57) ABSTRACT

The present disclosure discloses a camera lens group including, sequentially from an object side to an image side of the camera lens group along an optical axis, a first lens, a second lens, a third lens, a fourth lens and a fifth lens. The first lens has a negative refractive power; the second lens has a negative refractive power; the third lens has a refractive power, and an object-side surface of the third lens is concave; the fourth lens has a positive refractive power, an object-side surface of the fourth lens is convex, and an image-side surface of the fourth lens is convex; and the fifth lens has a refractive power. A half of a maximum field of view HFOV of the camera lens group satisfies $0.8<\tan(\text{HFOV}/2)<1.2$.

19 Claims, 14 Drawing Sheets

(56) References Cited

U.S. PATENT DOCUMENTS

| | | | | |
|---|---|---|---|---|
| 2013/0050846 A1* | 2/2013 | Huang | ............... | G02B 13/0045 |
| | | | | 359/713 |
| 2018/0095237 A1* | 4/2018 | Kanzaki | ................... | G02B 9/60 |
| 2019/0146186 A1* | 5/2019 | Liao | ......................... | G02B 9/60 |
| | | | | 359/714 |
| 2019/0154991 A1* | 5/2019 | Kim | ................... | G02B 13/0045 |
| 2021/0173182 A1* | 6/2021 | Dai | .......................... | G02B 9/64 |

FOREIGN PATENT DOCUMENTS

| | | | |
|---|---|---|---|
| CN | 203930183 | U | 11/2014 |
| CN | 105487201 | A | 4/2016 |
| CN | 205679845 | U | 11/2016 |
| CN | 106950679 | A | 7/2017 |
| CN | 107203031 | A | 9/2017 |
| CN | 108445609 | A | 8/2018 |
| CN | 208488591 | U | 2/2019 |
| JP | H04267212 | A | 9/1992 |
| JP | 2017198947 | A | 11/2017 |
| WO | 2010084914 | A1 | 7/2010 |

OTHER PUBLICATIONS

First Chinese Office Action for Application No. 201811346367.3, dated Jun. 19, 2020, 6 pages.
First Chinese Office Action for Application No. 201810566935.4, dated Apr. 15, 2019, 8 pages.

* cited by examiner

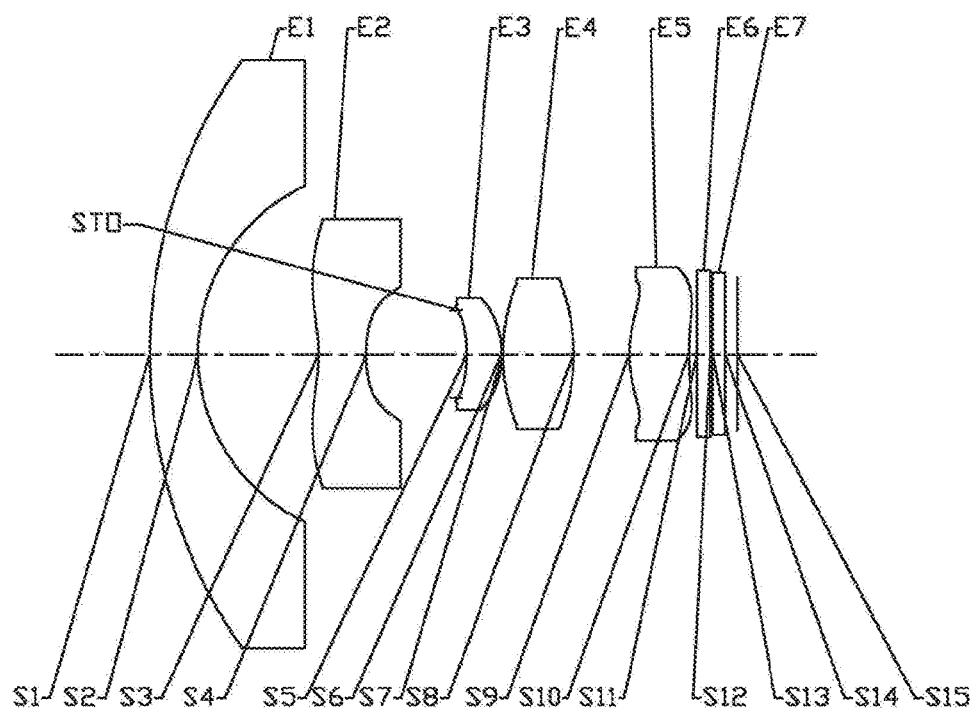
Fig. 9
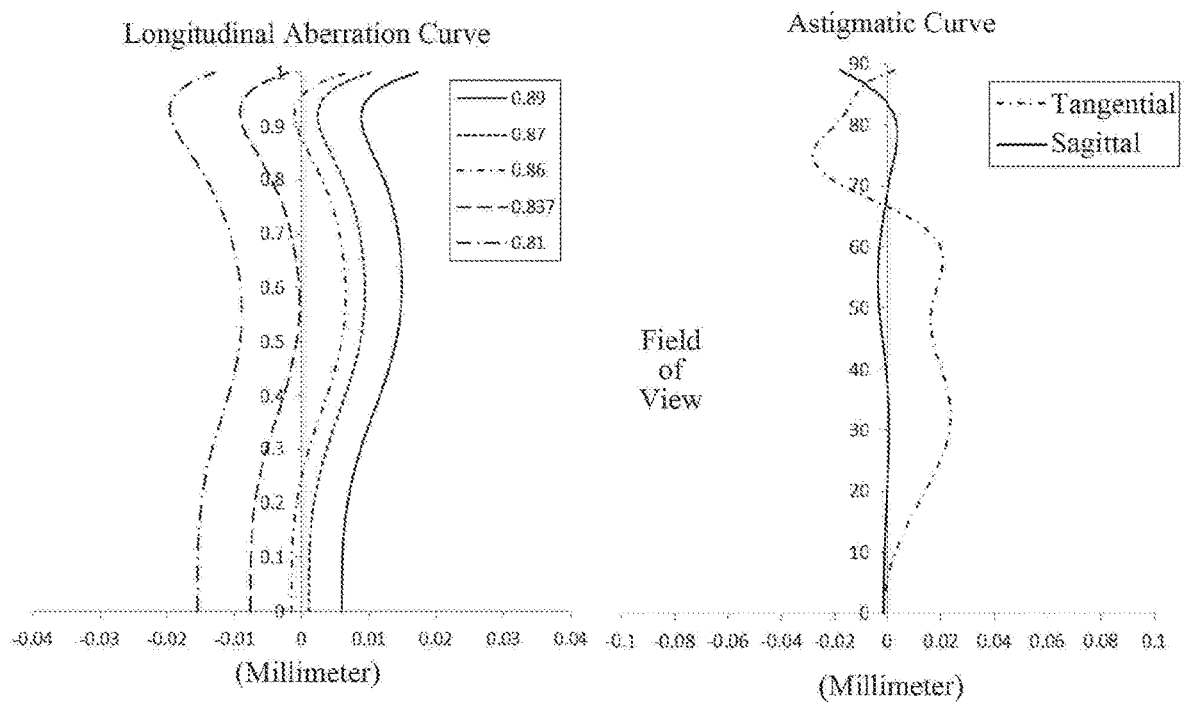
Fig. 10A                     Fig. 10B

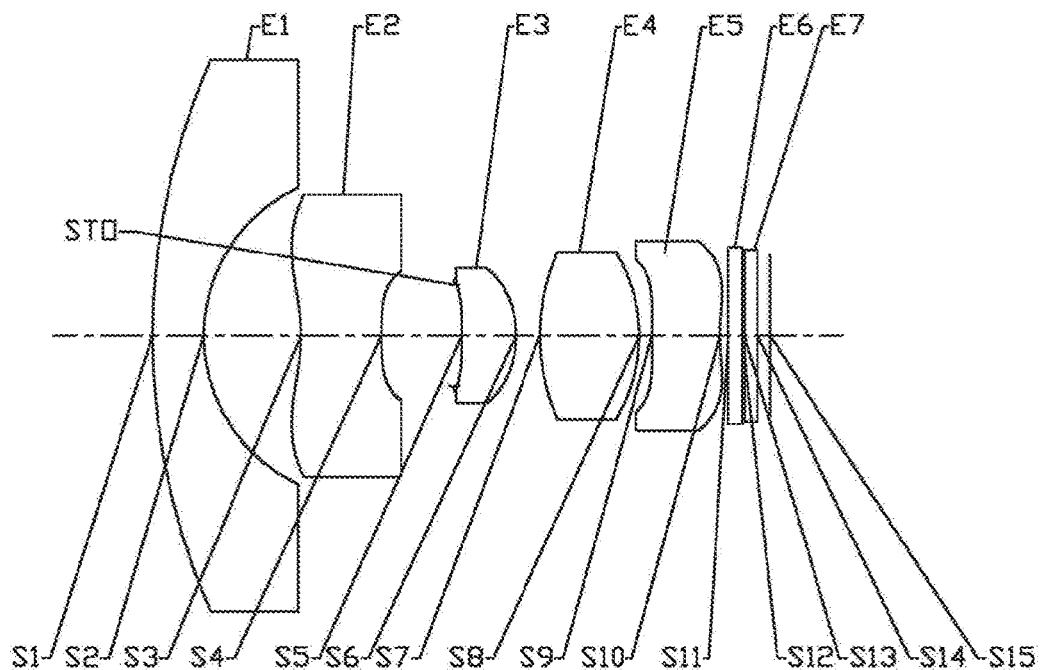
Fig. 17
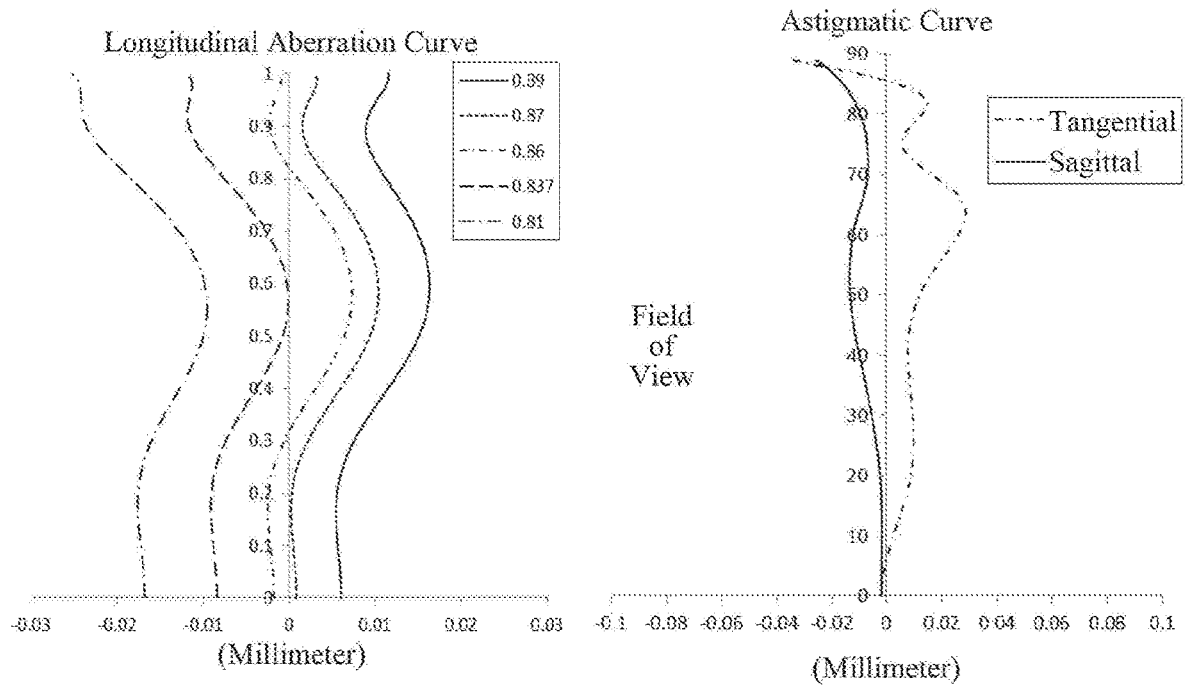
Fig. 18A
Fig. 18B

CAMERA LENS GROUP

CROSS-REFERENCE TO RELATED APPLICATIONS

The present patent application is a continuation of International Application No. PCT/CN2018/116310, filed on Nov. 20, 2018, which claims the priority from Chinese Patent Application No. 201810566935.4, filed before the China National Intellectual Property Administration (CNIPA) on Jun. 5, 2018, the entire disclosures of which are incorporated herein by reference in their entireties.

TECHNICAL FIELD

The present disclosure relates to a camera lens group, and more specifically to a camera lens group including five lenses.

BACKGROUND

In recent years, the three-dimensional depth recognition technology has been developed rapidly. The camera equipped with the three-dimensional depth recognition technology can easily obtain a spatial position and three-dimensional size information of a photographed object, which is of great significance in technical applications such as human-computer interaction and augmented reality. TOF technology is one of the important three-dimensional detection solutions currently in common use.

TOF technology, also known as Time of Flight, refers to such a technology that locates a target object by detecting the flight (round trip) time of a light pulse. Unlike traditional single-point laser ranging, the TOF technology uses an array-type detector to simultaneously acquire three-dimensional spatial information of the entire object. Generally, a lens configured with a TOF camera needs to have a large relative aperture and a small chief ray incident angle (CRA). At the same time, in order to meet the working requirements at different temperatures, it is also required for some TOF lenses to have a characteristic of temperature drift.

SUMMARY

The present disclosure provides a camera lens group, for example, a camera lens group that can be applied to a TOF camera, that can at least or partially address at least one of the above disadvantages of the prior art.

According to an aspect of the present disclosure, a camera lens group is provided. The camera lens group include, sequentially from an object side to an image side along an optical axis, a first lens, a second lens, a third lens, a fourth lens and a fifth lens. The first lens may have a negative refractive power; the second lens may have a negative refractive power; the third lens has a positive refractive power or a negative refractive power, and an object-side surface thereof may be concave; the fourth lens may have a positive refractive power, an object-side surface thereof may be convex, and an image-side surface thereof may be convex; and the fifth lens has a positive refractive power or a negative refractive power. Here, a half of a maximum field of view HFOV of the camera lens group may satisfy $0.8<\tan(HFOV/2)<1.2$.

In one embodiment, a total effective focal length f of the camera lens group and an effective focal length f4 of the fourth lens may satisfy $-0.02<f/f4<0.5$.

In one embodiment, a total effective focal length f of the camera lens group and an effective focal length f1 of the first lens may satisfy $-0.45<f/f1<0$.

In one embodiment, an effective focal length f1 of the first lens and an effective focal length f2 of the second lens may satisfy $0.3<f1/f2<3$.

In one embodiment, a half of a diagonal length ImgH of an effective pixel area on an imaging plane of the camera lens group, an entrance pupil diameter EPD of the camera lens group and a total effective focal length f of the camera lens group may satisfy $1<ImgH\times EPD/f^2<2$.

In one embodiment, a radius of curvature R8 of an image-side surface of the fourth lens and an effective focal length f4 of the fourth lens may satisfy $-2<R8/f4<0$.

In one embodiment, an interval distance T45 along the optical axis between the fourth lens and the fifth lens and a distance TTL along the optical axis from an object-side surface of the first lens to an imaging plane of the camera lens group may satisfy $0.5<T45\times10/TTL<1.5$.

In one embodiment, a center thickness CT4 along the optical axis of the fourth lens and a center thickness CT5 along the optical axis of the fifth lens may satisfy $0.5<CT4/CT5<1.5$.

In one embodiment, the camera lens group further includes a stop disposed between the object side and the third lens, and may include at least one glass lens between the stop and the image side.

In one embodiment, among the glass lenses located between the stop and the image side, a thermal expansion coefficient TCE of a lens closest to the stop at 20° C. may satisfy $TCE<15\times10^{-6}/K$.

In one embodiment, $0<(T12+T23+T45)/TD<0.6$ may be satisfied, where T12 is an interval distance along the optical axis between the first lens and the second lens, T23 is an interval distance along the optical axis between the second lens and the third lens, T45 is an interval distance along the optical axis between the fourth lens and the fifth lens, and TD is a distance along the optical axis from an object-side surface of the first lens to an image-side surface of the fifth lens.

In one embodiment, a maximum effective radius DT21 of an object-side surface of the second lens and a maximum effective radius DT52 of an image-side surface of the fifth lens may satisfy $0.8 \leq DT21/DT52<1.6$.

In one embodiment, a maximum effective radius DT32 of an image-side surface of the third lens and a maximum effective radius DT52 of an image-side surface of the fifth lens may satisfy $0.5<DT32/DT52<1$.

In one embodiment, an object-side surface of the second lens may have at least one inflection point. A vertical distance YC21 from a critical point on an object-side surface of the second lens to the optical axis and a maximum effective radius DT21 of an object-side surface of the second lens may satisfy $0.2<YC21/DT21<1$.

According to another aspect of the present disclosure, a camera lens group is provided. The camera lens group include, sequentially from an object side to an image side along an optical axis, a first lens, a second lens, a third lens, a fourth lens and a fifth lens. The first lens may have a negative refractive power; the second lens may have a negative refractive power; the third lens has a positive refractive power or a negative refractive power, and an object-side surface thereof may be concave; the fourth lens may have a positive refractive power, an object-side surface thereof may be convex, and an image-side surface thereof may be convex; and the fifth lens has a positive refractive power or a negative refractive power. Here, the camera lens group further includes a stop disposed between the object side and the third lens, and may include at least one glass lens between the stop and the image side. Among the glass lenses located between the stop and the image side, a thermal expansion coefficient TCE of a lens closest to the stop at 20° C. may satisfy TCE<15×10$^{-6}$/K.

According to another aspect of the present disclosure, a camera lens group is provided. The camera lens group include, sequentially from an object side to an image side along an optical axis, a first lens, a second lens, a third lens, a fourth lens and a fifth lens. The first lens may have a negative refractive power; the second lens may have a negative refractive power; the third lens has a positive refractive power or a negative refractive power, and an object-side surface thereof may be concave; the fourth lens may have a positive refractive power, an object-side surface thereof may be convex, and an image-side surface thereof may be convex; and the fifth lens has a positive refractive power or a negative refractive power. Here, an object-side surface of the second lens may have at least one inflection point. A vertical distance YC21 from a critical point on an object-side surface of the second lens to the optical axis and a maximum effective radius DT21 of an object-side surface of the second lens may satisfy 0.2<YC21/DT21<1.

According to yet another aspect of the present disclosure, a camera lens group is provided. The camera lens group include, sequentially from an object side to an image side along an optical axis, a first lens, a second lens, a third lens, a fourth lens and a fifth lens. The first lens may have a negative refractive power; the second lens may have a negative refractive power; the third lens has a positive refractive power or a negative refractive power, and an object-side surface thereof may be concave; the fourth lens may have a positive refractive power, an object-side surface thereof may be convex, and an image-side surface thereof may be convex; and the fifth lens has a positive refractive power or a negative refractive power. Here, an interval distance T45 along the optical axis between the fourth lens and the fifth lens and a distance TTL along the optical axis from an object-side surface of the first lens to an imaging plane of the camera lens group may satisfy 0.5<T45×10/TTL<1.5.

According to yet another aspect of the present disclosure, a camera lens group is provided. The camera lens group include, sequentially from an object side to an image side along an optical axis, a first lens, a second lens, a third lens, a fourth lens and a fifth lens. The first lens may have a negative refractive power; the second lens may have a negative refractive power; the third lens has a positive refractive power or a negative refractive power, and an object-side surface thereof may be concave; the fourth lens may have a positive refractive power, an object-side surface thereof may be convex, and an image-side surface thereof may be convex; and the fifth lens has a positive refractive power or a negative refractive power. Here, a maximum effective radius DT21 of an object-side surface of the second lens and a maximum effective radius DT52 of an image-side surface of the fifth lens may satisfy 0.8≤DT21/DT52<1.6

According to yet another aspect of the present disclosure, a camera lens group is provided. The camera lens group include, sequentially from an object side to an image side along an optical axis, a first lens, a second lens, a third lens, a fourth lens and a fifth lens. The first lens may have a negative refractive power; the second lens may have a negative refractive power; the third lens has a positive refractive power or a negative refractive power, and an object-side surface thereof may be concave; the fourth lens may have a positive refractive power, an object-side surface thereof may be convex, and an image-side surface thereof may be convex; and the fifth lens has a positive refractive power or a negative refractive power. Here, a maximum effective radius DT32 of an image-side surface of the third lens and a maximum effective radius DT52 of an image-side surface of the fifth lens may satisfy 0.5<DT32/DT52<1.

The present disclosure employs five lenses. The optical imaging system described above has at least one advantageous effect such as ultra-wide angle, temperature drift reduction, large aperture, and applicable for TOF cameras and the like by properly distributing the refractive power, the surface shape, the center thickness of each lens, and the interval distance along the optical axis between the lenses.

BRIEF DESCRIPTION OF THE DRAWINGS

Other features, purpose and advantages of the present disclosure will become apparent through detailed description of the non-limiting embodiments given in conjunction with the accompanying drawings. In the drawings:

FIG. 9 is a schematic structural view of a camera lens group according to example 5 of the present disclosure;

FIGS. 10A to 10D illustrate a longitudinal aberration curve, an astigmatic curve, a lateral color curve and a relative illumination curve of the camera lens group according to example 5, respectively;

FIG. 17 is a schematic structural view of a camera lens group according to example 9 of the present disclosure;

FIGS. 18A to 18D illustrate a longitudinal aberration curve, an astigmatic curve, a lateral color curve and a relative illumination curve of the camera lens group according to example 9, respectively;

DETAILED DESCRIPTION OF EMBODIMENTS

Figure 1:
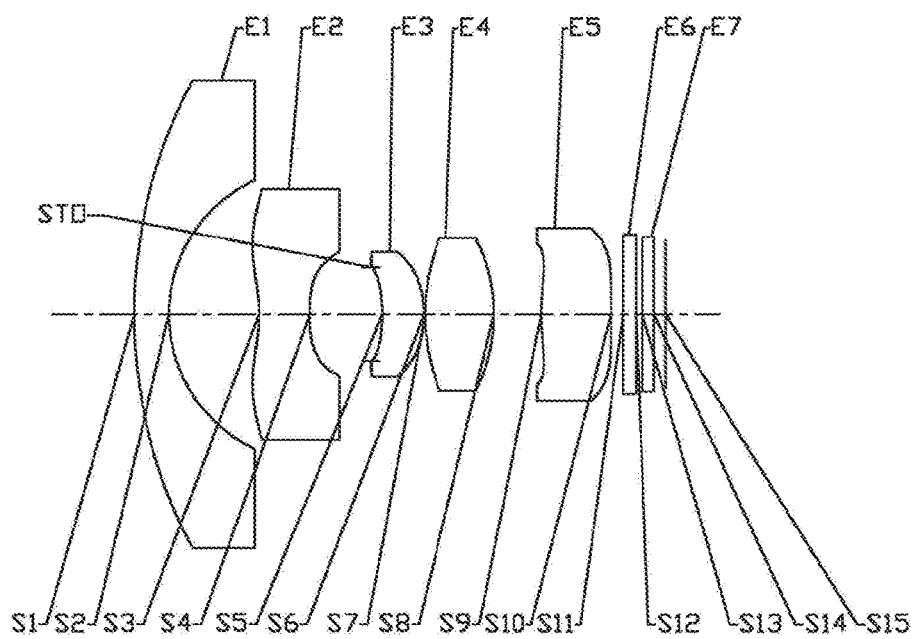
FIG. 1 is a schematic structural view of a camera lens group according to example 1 of the present disclosure.

For a better understanding of the present disclosure, various aspects of the present disclosure will be described in more detail with reference to the drawings. It should be understood that, these detailed descriptions are merely used for describing exemplary embodiments of the present disclosure, but not in any way for limiting the scope of the present disclosure. Throughout the specification, the same reference numerals designate the same elements. The expression "and/or" includes any and all combinations of one or more of the associated listed items.

It should be noted that, in the present specification, the expressions such as first, second and third are merely for distinguishing one feature from another feature without indicating any limitation on the features. Thus, a first lens discussed below could be referred to as a second lens or a third lens without departing from the teachings of the present disclosure.

In the accompanying drawings, for convenience of the description, thicknesses, sizes and shapes of lenses have been slightly exaggerated. Specifically, spherical or aspheric shapes shown in the accompanying drawings are shown as examples. That is, spherical or aspheric shapes are not limited to the spherical or aspheric shapes shown in the accompanying drawings. The accompanying drawings are merely examples, not strictly drawn to scale.

Herein, a paraxial region refers to a region near the optical axis. If a surface of a lens is a convex surface and the position of the convex is not defined, it indicates that the surface of the lens is convex at least in the paraxial region; if a surface of a lens is a concave surface and the position of the concave is not defined, it indicates that the surface of the lens is concave at least in the paraxial region. In each lens, the surface closest to the object side is referred to as an object-side surface, and the surface closest to the image side is referred to as an image-side surface.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing implementations of the present disclosure, refers to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the embodiments in the present disclosure and the features in the embodiments may be combined with each other on a non-conflict basis. The present disclosure will be described in detail below with reference to the accompanying drawings and in combination with the embodiments.

The features, principles, and other aspects of the present disclosure are described in detail below.

A camera lens group according to exemplary embodiments of the present disclosure may include, for example, five lenses having refractive power, i.e., a first lens, a second lens, a third lens, a fourth lens, and a fifth lens. These five lenses are sequentially arranged from an object side to an image side along an optical axis, and there may be an air gap between each adjacent lens.

In an exemplary embodiment, the first lens may have a negative refractive power; the second lens may have a negative refractive power; the third lens has a positive refractive power or a negative refractive power, and an object-side surface thereof may be concave; the fourth lens may have a positive refractive power, an object-side surface thereof may be convex, and an image-side surface thereof may be convex; and the fifth lens has a positive refractive power or a negative refractive power. Reasonably configuring the shape and refractive power of each lens can effectively improve the imaging quality of the lens assembly and increase the field of view, while ensuring the miniaturization of the lens assembly.

In an exemplary embodiment, an image-side surface of the third lens is convex.

In an exemplary embodiment, a stop may be provided between the object side and the third lens of the camera lens group to improve the imaging quality of the lens assembly. Optionally, the stop may be disposed between the second lens and the third lens. At least one lens among the lenses located between the stop and the image side is glass lens.

In an exemplary embodiment, among the glass lenses located between the stop and the image side, a thermal expansion coefficient TCE of the lens closest to the stop at 20° C. may satisfy $TCE<15\times10^{-6}/K$. More specifically, TCE may further satisfy $TCE<8\times10^{-6}/K$, for example, $TCE=7.10\times10^{-6}/K$. Using the glass material with a small thermal expansion coefficient can help eliminate temperature drift and meet the performance requirements of the lens assembly under different temperature conditions.

In an exemplary embodiment, the camera lens group of the present disclosure may satisfy $-0.02<f/f4<0.5$, where f is a total effective focal length of the camera lens group, and f4 is an effective focal length of the fourth lens. More specifically, f and f4 may further satisfy $0<f/f4<0.4$, and further, $0.2\leq f/f4\leq 0.4$, for example $0.24\leq f/f4\leq 0.33$. Reasonably configuring the refractive power of the fourth lens can help eliminate the system temperature drift to meet the working performance of the lens assembly under different temperature conditions.

In an exemplary embodiment, the camera lens group of the present disclosure may satisfy $-0.45<f/f1<0$, where f is a total effective focal length of the camera lens group, and f1 is an effective focal length of the first lens. More specifically, f and f1 may further satisfy $-0.40\leq f/f1\leq -0.10$. Reasonably configuring the refractive power of the first lens can effectively share a large field of view on the object side and facilitate subsequent lens groups to correct off-axis aberrations, thereby improving the imaging quality.

In an exemplary embodiment, the camera lens group of the present disclosure may satisfy $0.3<f1/f2<3$, where f1 is an effective focal length of the first lens, and f2 is an effective focal length of the second lens. More specifically, f1 and f2 may further satisfy $0.36 \le f1/f2 \le 2.79$. Reasonable configuration of the system's refractive power can ensure the compactness of the optical system structure.

In an exemplary embodiment, the camera lens group of the present disclosure may satisfy $1<ImgH \times EPD/f^2<2$, where ImgH is a half of a diagonal length of an effective pixel area on an imaging plane of the camera lens group, EPD is an entrance pupil diameter of the camera lens group, and f is a total effective focal length of the camera lens group. More specifically, ImgH, EPD and f may further satisfy $1<ImgH \times EPD/f^2<1.5$, for example, $1.05 \le ImgH \times EPD/f^2 \le 1.46$. Satisfying the conditional expression $1<ImgH \times EPD/f^2<2$ can help increase the relative aperture of the system, and obtain a larger working imaging plane and higher resolution, while ensuring the miniaturization of the lens assembly.

In an exemplary embodiment, the camera lens group of the present disclosure may satisfy $-2 \le R8/f4 \le 0$, where R8 is a radius of curvature of an image-side surface of the fourth lens, and f4 is an effective focal length of the fourth lens. More specifically, R8 and f4 may further satisfy $-1.5 \le R8/f4 \le -0.5$, for example, $-1.21 \le R8/f4 \le -0.93$. Satisfying the conditional expression $-2<R8/f4<0$ is conducive to ensuring the matching of the main chief ray angle (CRA) of the lens assembly, and can effectively correct the field curvature of the lens assembly, which is conducive to ensuring the imaging clarity at each field of view.

In an exemplary embodiment, the camera lens group of the present disclosure may satisfy $0.5<T45 \times 10/TTL<1.5$, where T45 is an interval distance along the optical axis between the fourth lens and the fifth lens, and TTL is a distance along the optical axis from an object-side surface of the first lens to an imaging plane of the camera lens group. More specifically, T45 and TTL may further satisfy $0.70 \le T45 \times 10/TTL \le 1.1$, for example, $0.80 \le T45 \times 10/TTL \le 1.08$. The reasonable configuration of the interval distance between the fourth lens and the fifth lens along the optical axis can effectively reduce the center thickness of the lens and reduce the sensitivity of the interval, which is beneficial for correcting field curvature.

In an exemplary embodiment, the camera lens group of the present disclosure may satisfy $0.5<CT4/CT5<1.5$, where CT4 is a center thickness along the optical axis of the fourth lens, and CT5 is a center thickness along the optical axis of the fifth lens. More specifically, CT4 and CT5 may further satisfy $0.70 \le CT4/CT5 \le 1.46$. Reasonable configuration of the center thickness of the fourth lens and the fifth lens can help to correct the system spherical aberration.

In an exemplary embodiment, the camera lens group of the present disclosure may satisfy $0<(T12+T23+T45)/TD<0.6$, where T12 is an interval distance along the optical axis between the first lens and the second lens, T23 is an interval distance along the optical axis between the second lens and the third lens, T45 is an interval distance along the optical axis between the fourth lens and the fifth lens, and TD is a distance along the optical axis from an object-side surface of the first lens to an image-side surface of the fifth lens. More specifically, T12, T23, T45 and TD may further satisfy $0.32 \le (T12+T23+T45)/TD \le 0.51$. The reasonable configuration of the interval distance between adjacent lenses along the optical axis can help achieve the compactness of the optical system structure.

In an exemplary embodiment, the camera lens group of the present disclosure may satisfy $0.8 \le DT21/DT52<1.6$, where DT21 is a maximum effective radius of an object-side surface of the second lens, and DT52 is a maximum effective radius of an image-side surface of the fifth lens. More specifically, DT21 and DT52 may further satisfy $0.80 \le DT21/DT52<1.55$. Satisfying the conditional expression $0.8 \le DT21/DT52<1.6$ can better ensure the structural feasibility of the camera lens group, reduce the difficulty of system assembly, and ensure the process requirements of "one-end assembly".

In an exemplary embodiment, the camera lens group of the present disclosure may satisfy $0.5<DT32/DT52<1$, where DT32 is a maximum effective radius of an image-side surface of the third lens, and DT52 is a maximum effective radius of an image-side surface of the fifth lens. More specifically, DT32 and DT52 may further satisfy $0.59 \le DT32/DT52 \le 0.81$. Reasonably configuring the maximum effective radius of the lens can effectively reduce the eccentric sensitivity of each component of the system and meet processability and process requirements.

Figure 19:
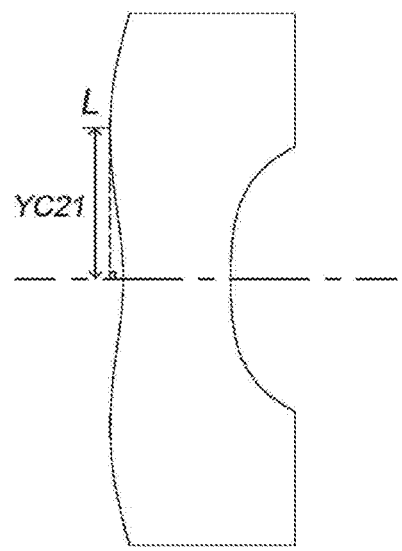
FIG. 19 schematically illustrates a critical point L on an object-side surface of a second lens and a vertical distance YC21 from the critical point L to an optical axis.

In an exemplary embodiment, an object-side surface of the second lens has at least one inflection point. The camera lens group of the present disclosure may satisfy $0.2<YC21/DT21<1$, where YC21 is a vertical distance from a critical point on an object-side surface of the second lens to the optical axis, and DT21 is a maximum effective radius of an object-side surface of the second lens. The critical point on the object-side surface of the second lens refers to a point on the object-side surface of the second lens that is tangent to a tangent plane perpendicular to the optical axis, except for the intersection point with the optical axis. For example, the critical point L shown schematically in FIG. 19. More specifically, YC21 and DT21 may further satisfy $0.27 \le YC21/DT21 \le 0.77$. Reasonably controlling the position of the inflection point can correct the aberrations at each field of view while sharing the large field of view on the object side, which can help improve the imaging quality and ensure the compactness of the optical system structure.

In an exemplary embodiment, the camera lens group of the present disclosure may satisfy $0.8<\tan(HFOV/2)<1.2$, where HFOV is a half of a maximum field of view of the camera lens group. More specifically, HFOV may further satisfy $0.82 \le \tan(HFOV/2) \le 1.00$. Satisfying the conditional expression $0.8<\tan(HFOV/2)<1.2$ can be helpful to increase the field of view at the object side of the system to obtain a larger range of spatial information.

Optionally, the camera lens group described above may further include an optical filter for correcting chromatic aberration and/or a protective glass for protecting a photosensitive element on the imaging plane.

The camera lens group according to the above embodiments of the present disclosure may employ a plurality of lenses, such as five lenses as described above. By properly assigning the refractive power, the surface shape, the center thickness of each lens, and interval distances along the optical axis between the lenses, the size and the sensitivity of the lens assembly can be effectively reduced, and the processability of the lens assembly can be improved, such that the camera lens group is more conducive to production and processing and can be applied to, for example, TOF cameras. At the same time, the camera lens group configured above can have beneficial effects such as ultra-wide angle, low-temperature drift, and large aperture.

In the embodiments of the present disclosure, most of the lenses employ aspheric lens. The aspheric lens is characterized by a continuous change in curvature from the center of the lens to the periphery of the lens. Unlike a spherical lens having a constant curvature from the center of the lens to the periphery of the lens, the aspheric lens has a better radius of curvature characteristic, and has the advantages of improving distortion aberration and improving astigmatic aberration. Using aspheric lens, the aberrations that occur during imaging can be eliminated as much as possible and thus improving imaging quality.

However, it will be understood by those skilled in the art that the number of lenses constituting the camera lens group can be varied to achieve the various results and advantages described in this specification without departing from the technical solution claimed by the present disclosure. For example, although the embodiments are described by taking five lenses as an example, the camera lens group is not limited to including five lenses. The camera lens group can also include other numbers of lenses if desired.

Specific examples applicable to the camera lens group of the above embodiments will be further described below with reference to the accompanying drawings.

Example 1

A camera lens group according to example 1 of the present disclosure is described below with reference to FIG. 1 to FIG. 2D. FIG. 1 is a schematic structural view of the camera lens group according to example 1 of the present disclosure.

As shown in FIG. 1, the camera lens group according to an exemplary embodiment of the present disclosure includes, sequentially from an object side to an image side along an optical axis, a first lens E1, a second lens E2, a stop STO, a third lens E3, a fourth lens E4, a fifth lens E5, an optical filter E6, a protective glass E7 and an imaging plane S15.

The first lens E1 has a negative refractive power, an object-side surface S1 thereof is convex, and an image-side surface S2 thereof is concave. The second lens E2 has a negative refractive power, an object-side surface S3 thereof is concave, and an image-side surface S4 thereof is concave. The third lens E3 has a positive refractive power, an object-side surface S5 thereof is concave, and an image-side surface S6 thereof is convex. The fourth lens E4 has a positive refractive power, an object-side surface S7 thereof is convex, and an image-side surface S8 thereof is convex. The fifth lens E5 has a positive refractive power, an object-side surface S9 thereof is convex, and an image-side surface S10 thereof is flat. The optical filter E6 has an object-side surface S11 and an image-side surface S12. The protective glass E7 has an object-side surface S13 and an image-side surface S14. Light from the object sequentially passes through the respective surfaces S1 to S14 and is finally imaged on the imaging plane S15.

Optionally, the object-side surface S3 of the second lens E2 has at least one inflection point.

Optionally, at least one of the third lens E3, the fourth lens E4, and the fifth lens E5 located between the stop STO and the imaging plane S15 is glass lens. Among the glass lenses located between the stop STO and the imaging plane S15, a thermal expansion coefficient of the lens closest to the stop STO is TCE=$7.10 \times 10^{-6}$/K at 20° C.

Table 1 shows the surface type, radius of curvature, thickness, material and conic coefficient of each lens of the camera lens group in example 1, wherein the units for the radius of curvature and the thickness are millimeter (mm).

Antibody 37 came from an immunization protocol where human full length α-Synuclein-fibrils was used, alternating

TABLE 1

| Surface No. | Surface Type | Radius of Curvature | Thickness | Material Refractive Index | Abbe Number | Conic coefficient |
|---|---|---|---|---|---|---|
| OBJ | Spherical | Infinite | 2500.0000 | | | |
| S1 | Spherical | 21.1743 | 1.5001 | 1.73 | 54.7 | |
| S2 | Spherical | 6.3447 | 3.8426 | | | |
| S3 | Aspheric | −5.7418 | 2.1595 | 1.53 | 55.8 | −14.3572 |
| S4 | Aspheric | 11.3046 | 2.6123 | | | 11.0793 |
| STO | Spherical | Infinite | 0.4751 | | | |
| S5 | Aspheric | −7.6145 | 1.7813 | 1.62 | 23.5 | 6.8623 |
| S6 | Aspheric | −4.3848 | 0.0571 | | | 0.7587 |
| S7 | Spherical | 8.8981 | 2.9398 | 1.64 | 55.4 | |
| S8 | Spherical | −7.3087 | 2.0219 | | | |
| S9 | Aspheric | 10.2979 | 2.9778 | 1.62 | 23.5 | −26.3615 |
| S10 | Aspheric | Infinite | 0.5178 | | | −94.8955 |
| S11 | Spherical | Infinite | 0.5500 | 1.52 | 64.2 | |
| S12 | Spherical | Infinite | 0.2552 | | | |
| S13 | Spherical | Infinite | 0.5000 | 1.52 | 64.2 | |
| S14 | Spherical | Infinite | 0.5013 | | | |
| S15 | Spherical | Infinite | | | | |

As can be seen from Table 1, the object-side surface and the image-side surface of the first lens E1 and the fourth lens E4 are spherical, and the object-side surface and the image-side surface of the second lens E2, the third lens E3 and the fifth lens E5 are aspheric. In this example, the surface shape x of each aspheric lens can be defined by using, but not limited to, the following aspheric formula:

$$x = \frac{ch^2}{1 + \sqrt{1 - (k+1)c^2h^2}} + \sum A_i h^i \quad (1)$$

Here, x is the sag—the axis-component of the displacement of the aspheric surface from the aspheric vertex, when the aspheric surface is at height h from the optical axis; c is the paraxial curvature of the aspheric surface, c=1/R (that is, the paraxial curvature c is reciprocal of the radius of curvature in the above Table 1); k is the conic coefficient (given in Table 1); Ai is a correction coefficient for the i-th order of the aspheric surface. Table 2 below shows high-order coefficients $A_4$, $A_6$, $A_8$, $A_{10}$, $A_{12}$, $A_{14}$ and $A_{16}$ which are applicable to respective aspheric surface S3-S6 and S9-S10 in example 1.

along the optical axis from the object-side surface S1 of the first lens E1 to the image-side surface S10 of the fifth lens E5;

DT21/DT52=1.45, where DT21 is a maximum effective radius of the object-side surface S3 of the second lens E2, and DT52 is a maximum effective radius of the image-side surface S10 of the fifth lens E5;

TABLE 2

| Surface No. | A4 | A6 | A8 | A10 | A12 | A14 | A16 |
|---|---|---|---|---|---|---|---|
| S3 | 4.4937E−03 | −2.7921E−04 | 1.3686E−05 | −4.4889E−07 | 8.2506E−09 | −6.4665E−11 | 0.0000E+00 |
| S4 | 1.6397E−02 | 2.4691E−04 | −6.0670E−04 | 2.7703E−04 | −5.8674E−05 | 6.6169E−06 | −3.1001E−07 |
| S5 | −3.8789E−03 | −8.2344E−04 | 4.7149E−04 | −2.8501E−04 | 8.3335E−05 | −1.3157E−05 | 8.0987E−07 |
| S6 | −1.2756E−03 | −7.7943E−06 | −3.7410E−05 | 7.2862E−06 | −8.4803E−07 | 2.3037E−08 | 9.5226E−10 |
| S9 | −1.9113E−03 | 1.0058E−04 | −2.2710E−04 | 6.0087E−05 | −9.2725E−06 | 7.5441E−07 | −2.6198E−08 |
| S10 | −2.1459E−03 | −4.1069E−04 | 7.7864E−05 | −1.3518E−05 | 1.3096E−06 | −6.4807E−08 | 1.2730E−09 |

Table 3 shows a total track length TTL (i.e. a distance along the optical axis from the object-side surface S1 of the first lens E1 to imaging plane S15) of the camera lens group, a half of a diagonal length ImgH of an effective pixel area on the imaging plane S15, a half of a maximum field of view HFOV, F Number Fno, a total effective focal length f and effective focal lengths f1 to f5 of respective lens in example 1.

TABLE 3

| TTL (mm) | 22.69 | f1 (mm) | −13.18 |
|---|---|---|---|
| ImgH (mm) | 3.13 | f2 (mm) | −6.92 |
| HFOV (°) | 86.9 | f3 (mm) | 13.77 |
| Fno | 1.22 | f4 (mm) | 6.86 |
| f (mm) | 2.08 | f5 (mm) | 16.61 |

The camera lens group in example 1 satisfies:

f/f4=0.30, where f is the total effective focal length of the camera lens group, and f4 is the effective focal length of the fourth lens E4;

f/f1=−0.16, where f is the total effective focal length of the camera lens group, and f1 is the effective focal length of the first lens E1;

f1/f2=1.91, where f1 is the effective focal length of the first lens E1, and f2 is the effective focal length of the second lens E2;

ImgH×EPD/$f^2$=1.23, where, ImgH is the half of the diagonal length of the effective pixel area on the imaging plane S15 of the camera lens group, EPD is an entrance pupil diameter of the camera lens group, and f is the total effective focal length of the camera lens group;

R8/f4=−1.07, where R8 is a radius of curvature of the image-side surface S8 of the fourth lens E4, and f4 is the effective focal length of the fourth lens E4;

T45×10/TTL=0.89, where T45 is an interval distance along the optical axis between the fourth lens E4 and the fifth lens E5, and TTL is a distance along the optical axis from the object-side surface S1 of the first lens E1 to the imaging plane S15 of the camera lens group;

CT4/CT5=0.99, where CT4 is a center thickness along the optical axis of the fourth lens E4, and CT5 is a center thickness along the optical axis of the fifth lens E5;

(T12+T23+T45)/TD=0.44, where T12 is an interval distance along the optical axis between the first lens E1 and the second lens E2, T23 is an interval distance along the optical axis between the second lens E2 and the third lens E3, T45 is an interval distance along the optical axis between the fourth lens E4 and the fifth lens E5, and TD is a distance DT32/DT52=0.72, where DT32 is a maximum effective radius of the image-side surface S6 of the third lens E3, and DT52 is a maximum effective radius of the image-side surface S10 of the fifth lens E5;

YC21/DT21=0.56, where YC21 is a vertical distance from a critical point of the object-side surface S3 of the second lens E2 to the optical axis, and DT21 is a maximum effective radius of the object-side surface S3 of the second lens E2; and tan(HFOV/2)=0.95, where HFOV is the half of the maximum field of view of the camera lens group.

Figures 2A, 2B:
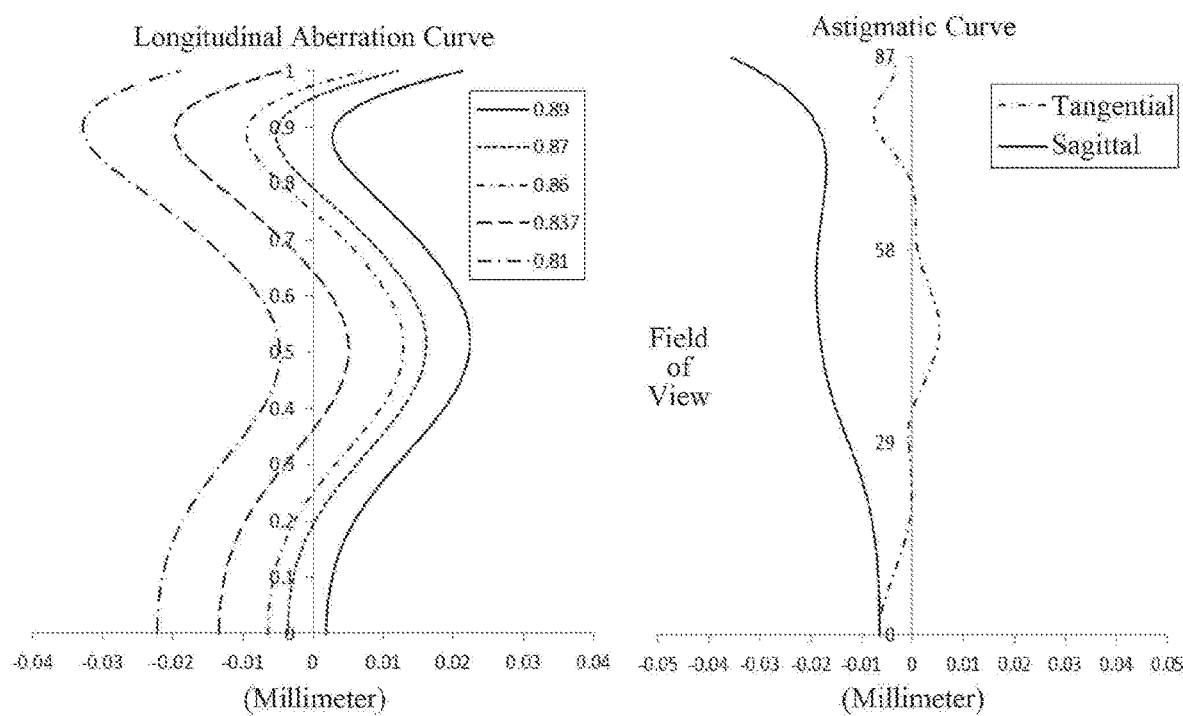
FIGS. 2A to 2D illustrate a longitudinal aberration curve, an astigmatic curve, a lateral color curve and a relative illumination curve of the camera lens group according to example 1, respectively.
Figure 2C:
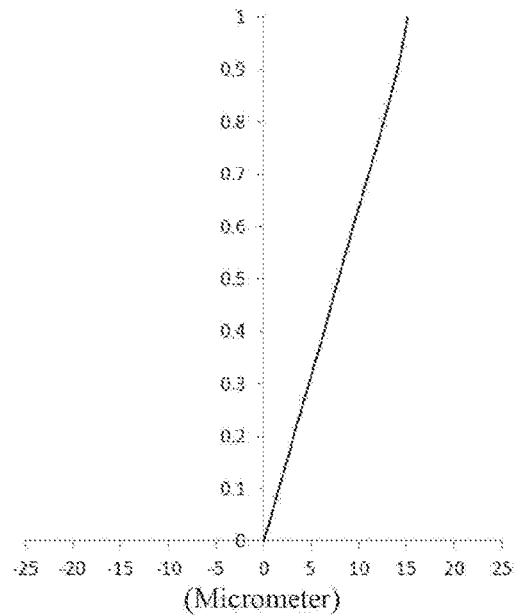
Figure 2D:
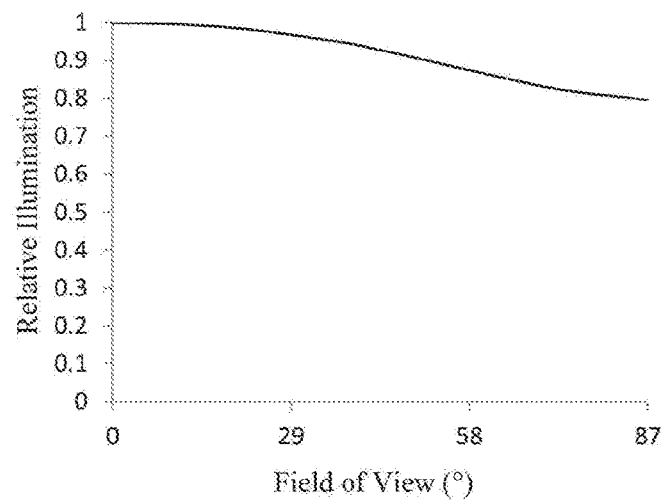

FIG. 2A illustrates a longitudinal aberration curve of the camera lens group according to example 1, representing deviations of focal points converged by light of different wavelengths after passing through the lens assembly. FIG. 2B illustrates an astigmatic curve of the camera lens group according to example 1, representing a curvature of a tangential plane and a curvature of a sagittal plane. FIG. 2C illustrates a lateral color curve of the camera lens group according to example 1, representing deviations of different image heights on an imaging plane after light passes through the lens assembly. FIG. 2D illustrates a relative illumination curve of the camera lens group according to example 1, representing the relative illumination corresponding to different FOVs. It can be seen from FIG. 2A to FIG. 2D that the camera lens group provided in example 1 can achieve a good imaging quality.

Example 2

Figure 3:
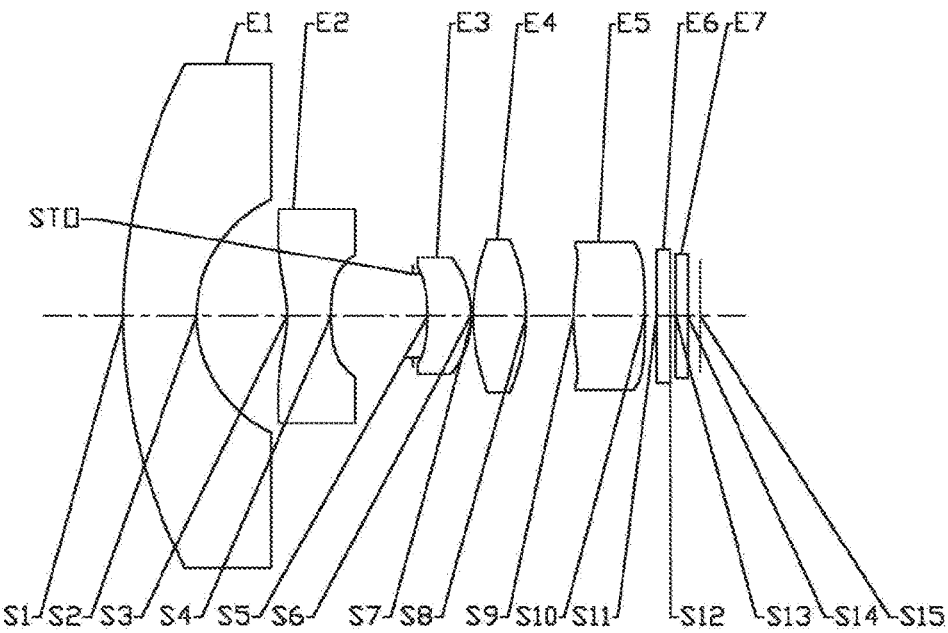
FIG. 3 is a schematic structural view of a camera lens group according to example 2 of the present disclosure.

A camera lens group according to example 2 of the present disclosure is described below with reference to FIG. 3 to FIG. 4D. In this example and the following examples, for the purpose of brevity, the description of parts similar to those in example 1 will be omitted. FIG. 3 is a schematic structural view of the camera lens group according to example 2 of the present disclosure.

As shown in FIG. 3, the camera lens group according to an exemplary embodiment of the present disclosure includes, sequentially from an object side to an image side along an optical axis, a first lens E1, a second lens E2, a stop STO, a third lens E3, a fourth lens E4, a fifth lens E5, an optical filter E6, a protective glass E7 and an imaging plane S15.

The first lens E1 has a negative refractive power, an object-side surface S1 thereof is convex, and an image-side surface S2 thereof is concave. The second lens E2 has a negative refractive power, an object-side surface S3 thereof is concave, and an image-side surface S4 thereof is concave.

The third lens E3 has a positive refractive power, an object-side surface S5 thereof is concave, and an image-side surface S6 thereof is convex. The fourth lens E4 has a positive refractive power, an object-side surface S7 thereof is convex, and an image-side surface S8 thereof is convex. The fifth lens E5 has a positive refractive power, an object-side surface S9 thereof is convex, and an image-side surface S10 thereof is convex. The optical filter E6 has an object-side surface S11 and an image-side surface S12. The protective glass E7 has an object-side surface S13 and an image-side surface S14. Light from the object sequentially passes through the respective surfaces S1 to S14 and is finally imaged on the imaging plane S15.

Optionally, the object-side surface S3 of the second lens E2 has at least one inflection point.

Optionally, at least one of the third lens E3, the fourth lens E4, and the fifth lens E5 located between the stop STO and the imaging plane S15 is glass lens. Among the glass lenses located between the stop STO and the imaging plane S15, a thermal expansion coefficient of the lens closest to the stop STO is TCE=7.1×10$^{-6}$/K at 20° C.

Table 4 shows the surface type, radius of curvature, thickness, material and conic coefficient of each lens of the camera lens group in example 2, wherein the units for the radius of curvature and the thickness are millimeter (mm).

Table 6 shows a total track length TTL of the camera lens group, a half of a diagonal length ImgH of an effective pixel area on the imaging plane S15, a half of a maximum field of view HFOV, F Number Fno, a total effective focal length f and effective focal lengths f1 to f5 of respective lens in example 2.

TABLE 6

| TTL (mm) | 22.50 | f1 (mm) | −10.39 |
| ImgH (mm) | 2.28 | f2 (mm) | −6.39 |
| HFOV (°) | 86.9 | f3 (mm) | 13.65 |
| Fno | 1.28 | f4 (mm) | 6.75 |
| f (mm) | 1.62 | f5 (mm) | 12.70 |

Figure 4A:
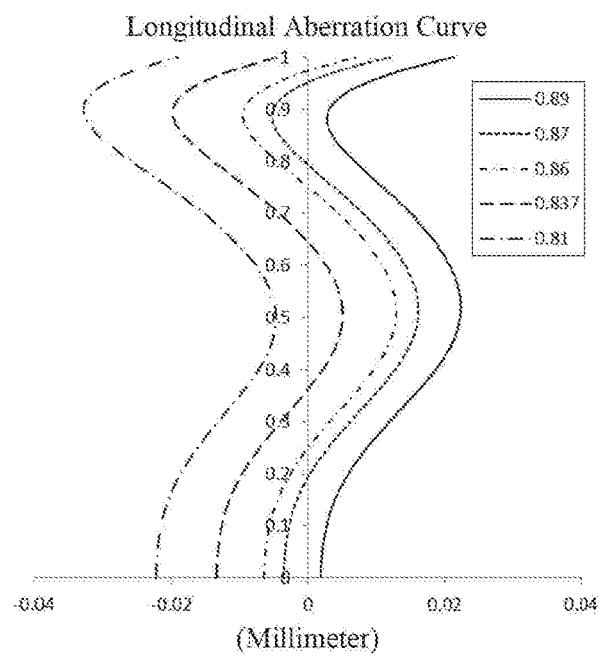
FIGS. 4A to 4D illustrate a longitudinal aberration curve, an astigmatic curve, a lateral color curve and a relative illumination curve of the camera lens group according to example 2, respectively.
Figure 4B:
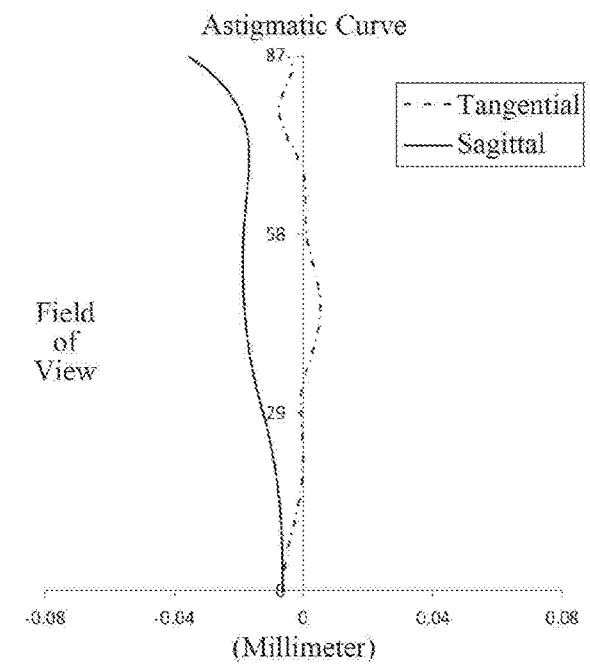
Figure 4C:
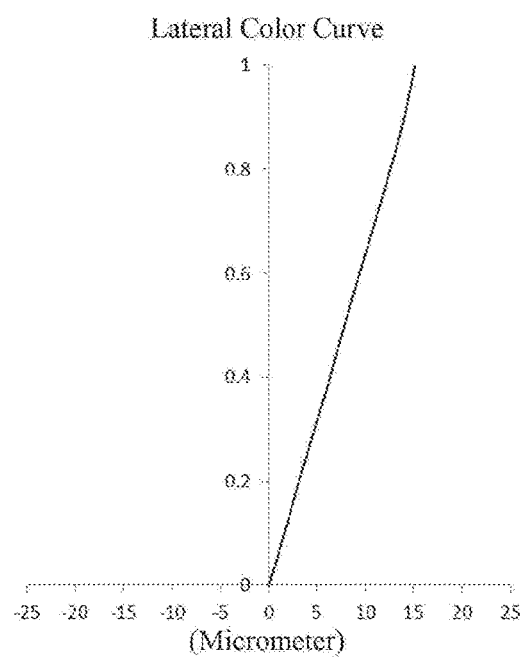
Figure 4D:
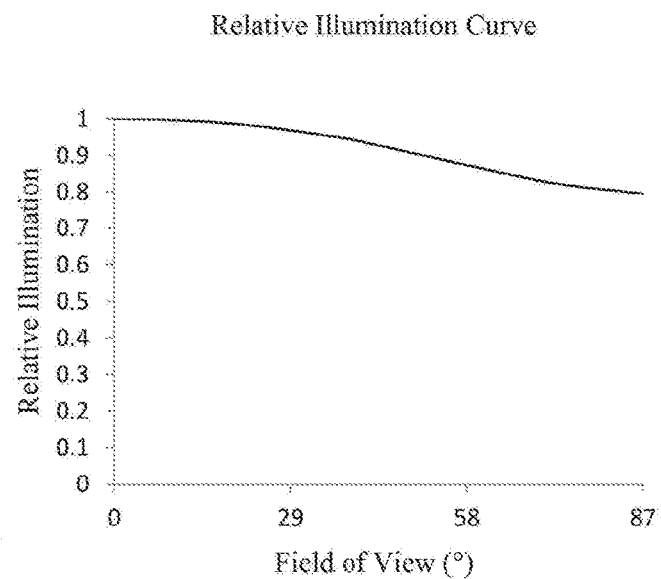

FIG. 4A illustrates a longitudinal aberration curve of the camera lens group according to example 2, representing deviations of focal points converged by light of different wavelengths after passing through the lens assembly. FIG. 4B illustrates an astigmatic curve of the camera lens group according to example 2, representing a curvature of a tangential plane and a curvature of a sagittal plane. FIG. 4C illustrates a lateral color curve of the camera lens group

TABLE 4

| Surface No. | Surface Type | Radius of Curvature | Thickness | Material Refractive Index | Abbe Number | Conic coefficient |
| --- | --- | --- | --- | --- | --- | --- |
| OBJ | Spherical | Infinite | 2500.0000 | | | |
| S1 | Spherical | 22.2313 | 3.0000 | 1.73 | 54.7 | |
| S2 | Spherical | 5.2709 | 3.6748 | | | |
| S3 | Aspheric | −4.5227 | 1.8000 | 1.53 | 55.8 | −9.7438 |
| S4 | Aspheric | 15.0000 | 3.3223 | | | 26.8055 |
| STO | Spherical | Infinite | 0.5996 | | | |
| S5 | Aspheric | −7.4080 | 1.7898 | 1.62 | 23.5 | 7.3261 |
| S6 | Aspheric | −4.3152 | 0.0879 | | | 0.6688 |
| S7 | Spherical | 8.6194 | 2.1520 | 1.64 | 55.4 | |
| S8 | Spherical | −7.5584 | 1.9306 | | | |
| S9 | Aspheric | 9.4785 | 2.9020 | 1.62 | 23.5 | −10.2912 |
| S10 | Aspheric | −41.0454 | 0.4768 | | | 51.9292 |
| S11 | Spherical | Infinite | 0.5500 | 1.52 | 64.2 | |
| S12 | Spherical | Infinite | 0.2142 | | | |
| S13 | Spherical | Infinite | 0.5000 | 1.52 | 64.2 | |
| S14 | Spherical | Infinite | 0.5013 | | | |
| S15 | Spherical | Infinite | | | | |

As can be seen from Table 4, in example 2, the object-side surface and the image-side surface of the first lens E1 and the fourth lens E4 are spherical, and the object-side surface and the image-side surface of the second lens E2, the third lens E3 and the fifth lens E5 are aspheric. Table 5 shows high-order coefficients applicable to each aspheric surface in example 2, wherein the surface shape of each aspheric surface can be defined by the formula (1) given in the above example 1.

according to example 2, representing deviations of different image heights on an imaging plane after light passes through the lens assembly. FIG. 4D illustrates a relative illumination curve of the camera lens group according to example 2, representing the relative illumination corresponding to different FOVs. It can be seen from FIG. 4A to FIG. 4D that the camera lens group provided in example 2 can achieve a good imaging quality.

TABLE 5

| Surface No. | A4 | A6 | A8 | A10 | A12 | A14 | A16 |
| --- | --- | --- | --- | --- | --- | --- | --- |
| S3 | 6.8673E−03 | −6.5153E−04 | 4.5357E−05 | −2.1767E−06 | 5.9706E−08 | −7.0139E−10 | 0.0000E+00 |
| S4 | 2.0739E−02 | −7.3624E−04 | −2.5524E−04 | 1.5567E−04 | −3.4321E−05 | 3.8534E−06 | −1.8285E−07 |
| S5 | −4.4145E−03 | −6.7289E−05 | −3.8815E−04 | 2.5544E−04 | −9.6885E−05 | 1.7769E−05 | −1.2852E−06 |
| S6 | −1.1828E−03 | 9.6560E−05 | −9.4519E−05 | 2.8811E−05 | −4.7297E−06 | 3.3998E−07 | −5.9770E−09 |
| S9 | −1.8015E−03 | −1.0387E−04 | −5.6129E−05 | 2.0409E−05 | −4.8967E−06 | 5.4635E−07 | −2.4774E−08 |
| S10 | −9.0707E−04 | −1.9137E−04 | 2.5250E−05 | −1.8402E−05 | 2.7412E−06 | −1.6546E−07 | 3.6748E−09 |

Example 3

Figure 5:
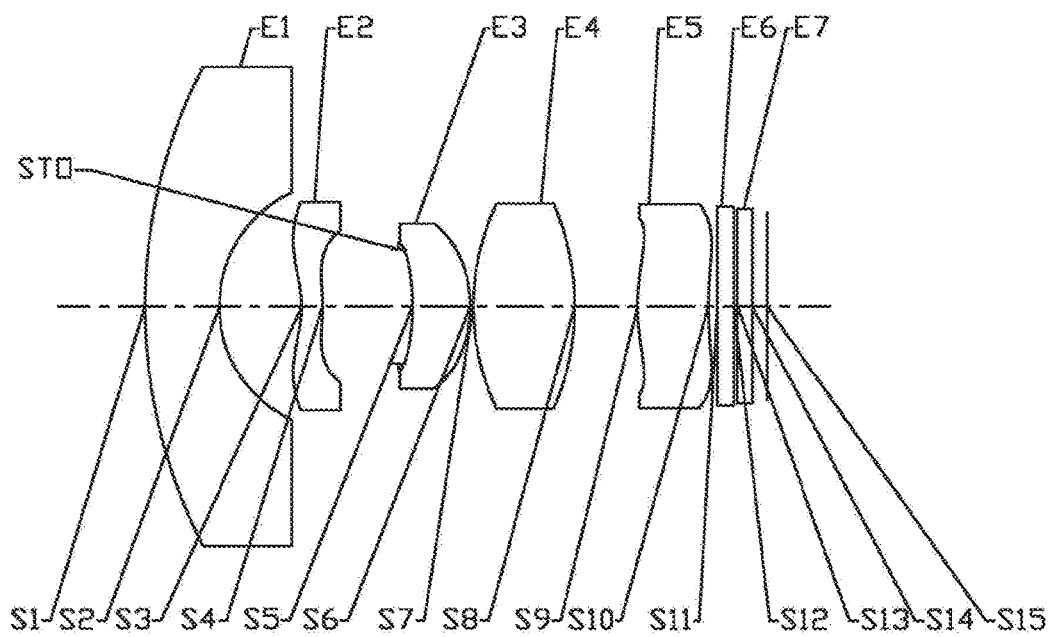
FIG. 5 is a schematic structural view of a camera lens group according to example 3 of the present disclosure.

A camera lens group according to example 3 of the present disclosure is described below with reference to FIG. 5 to FIG. 6D. FIG. 5 is a schematic structural view of the camera lens group according to example 3 of the present disclosure.

As shown in FIG. 5, the camera lens group according to an exemplary embodiment of the present disclosure includes, sequentially from an object side to an image side along an optical axis, a first lens E1, a second lens E2, a stop STO, a third lens E3, a fourth lens E4, a fifth lens E5, an optical filter E6, a protective glass E7 and an imaging plane S15.

The first lens E1 has a negative refractive power, an object-side surface S1 thereof is convex, and an image-side surface S2 thereof is concave. The second lens E2 has a negative refractive power, an object-side surface S3 thereof is concave, and an image-side surface S4 thereof is convex. The third lens E3 has a positive refractive power, an object-side surface S5 thereof is concave, and an image-side surface S6 thereof is convex. The fourth lens E4 has a positive refractive power, an object-side surface S7 thereof is convex, and an image-side surface S8 thereof is convex. The fifth lens E5 has a positive refractive power, an object-side surface S9 thereof is convex, and an image-side surface S10 thereof is concave. The optical filter E6 has an object-side surface S11 and an image-side surface S12. The protective glass E7 has an object-side surface S13 and an image-side surface S14. Light from the object sequentially passes through the respective surfaces S1 to S14 and is finally imaged on the imaging plane S15.

Optionally, the object-side surface S3 of the second lens E2 has at least one inflection point.

Optionally, at least one of the third lens E3, the fourth lens E4, and the fifth lens E5 located between the stop STO and the imaging plane S15 is glass lens. Among the glass lenses located between the stop STO and the imaging plane S15, a thermal expansion coefficient of the lens closest to the stop STO is TCE=$7.1 \times 10^{-6}$/K at 20° C.

Table 7 shows the surface type, radius of curvature, thickness, material and conic coefficient of each lens of the camera lens group in example 3, wherein the units for the radius of curvature and the thickness are millimeter (mm).

TABLE 7

| Surface No. | Surface Type | Radius of Curvature | Thickness | Material Refractive Index | Abbe Number | Conic coefficient |
|---|---|---|---|---|---|---|
| OBJ | Spherical | Infinite | 2500.0000 | | | |
| S1 | Spherical | 17.6940 | 2.5000 | 1.73 | 54.7 | |
| S2 | Spherical | 4.2307 | 2.7747 | | | |
| S3 | Aspheric | −3.1996 | 0.7006 | 1.53 | 55.8 | −8.3883 |
| S4 | Aspheric | −6.6944 | 2.5607 | | | −59.0754 |
| STO | Spherical | Infinite | 0.4504 | | | |
| S5 | Aspheric | −9.4324 | 1.9418 | 1.62 | 23.5 | 5.3936 |
| S6 | Aspheric | −4.3175 | 0.1047 | | | 0.4884 |
| S7 | Spherical | 8.1085 | 3.4159 | 1.64 | 55.4 | |
| S8 | Spherical | −8.8232 | 2.1111 | | | |
| S9 | Aspheric | 7.5399 | 2.3745 | 1.62 | 23.5 | −8.6804 |
| S10 | Aspheric | 12.1102 | 0.2991 | | | 1.8558 |
| S11 | Spherical | Infinite | 0.5500 | 1.52 | 64.2 | |
| S12 | Spherical | Infinite | 0.1182 | | | |
| S13 | Spherical | Infinite | 0.5000 | 1.52 | 64.2 | |
| S14 | Spherical | Infinite | 0.5013 | | | |
| S15 | Spherical | Infinite | | | | |

As can be seen from Table 7, in example 3, the object-side surface and the image-side surface of the first lens E1 and the fourth lens E4 are spherical, and the object-side surface and the image-side surface of the second lens E2, the third lens E3 and the fifth lens E5 are aspheric. Table 8 shows high-order coefficients applicable to each aspheric surface in example 3, wherein the surface shape of each aspheric surface can be defined by the formula (1) given in the above example 1.

TABLE 8

| Surface No. | A4 | A6 | A8 | A10 | A12 | A14 | A16 |
|---|---|---|---|---|---|---|---|
| S3 | 1.2325E−02 | −9.8809E−04 | 5.6926E−05 | −1.6323E−06 | 8.2506E−09 | −6.4665E−11 | 0.0000E+00 |
| S4 | 1.8352E−02 | 1.2839E−03 | −8.8511E−04 | 2.9627E−04 | −5.8674E−05 | 6.6169E−06 | −3.1001E−07 |
| S5 | −3.4189E−03 | −7.0147E−04 | 4.1962E−04 | −2.7045E−04 | 8.3335E−05 | −1.3157E−05 | 8.0987E−07 |
| S6 | −7.3854E−04 | −8.6693E−06 | −3.1553E−05 | 6.9190E−06 | −8.4803E−07 | 2.3037E−08 | 9.5226E−10 |
| S9 | −1.9254E−03 | 1.8439E−04 | −2.3167E−04 | 6.0029E−05 | −9.2725E−06 | 7.5441E−07 | −2.6198E−08 |
| S10 | −3.4147E−03 | −4.0713E−04 | 7.6132E−05 | −1.3609E−05 | 1.3096E−06 | −6.4807E−08 | 1.2730E−09 |

Table 9 shows a total track length TTL of the camera lens group, a half of a diagonal length ImgH of an effective pixel area on the imaging plane S15, a half of a maximum field of view HFOV, F Number Fno, a total effective focal length f and effective focal lengths f1 to f5 of respective lens in example 3.

TABLE 9

| TTL (mm) | 20.90 | f1 (mm) | −8.40 |
|---|---|---|---|
| ImgH (mm) | 3.17 | f2 (mm) | −12.48 |
| HFOV (°) | 80.0 | f3 (mm) | 11.21 |
| Fno | 1.28 | f4 (mm) | 7.29 |
| f (mm) | 2.36 | f5 (mm) | 26.88 |

Figures 6A, 6B:
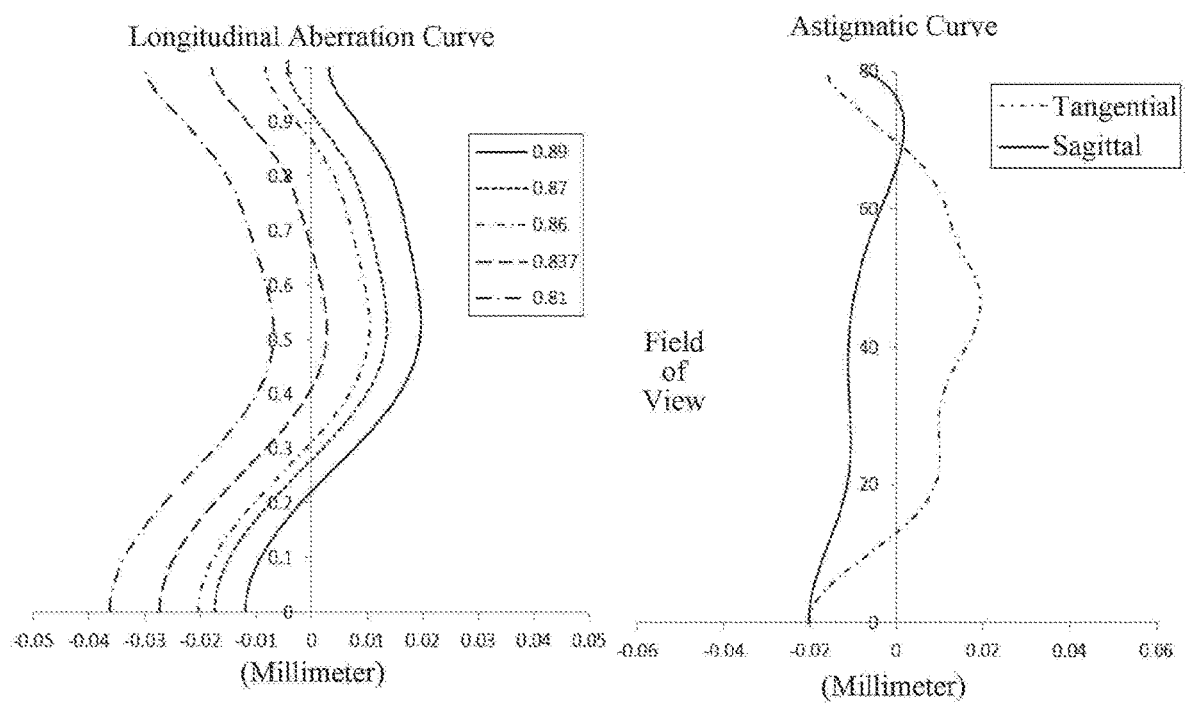
FIGS. 6A to 6D illustrate a longitudinal aberration curve, an astigmatic curve, a lateral color curve and a relative illumination curve of the camera lens group according to example 3, respectively.
Figure 6C:
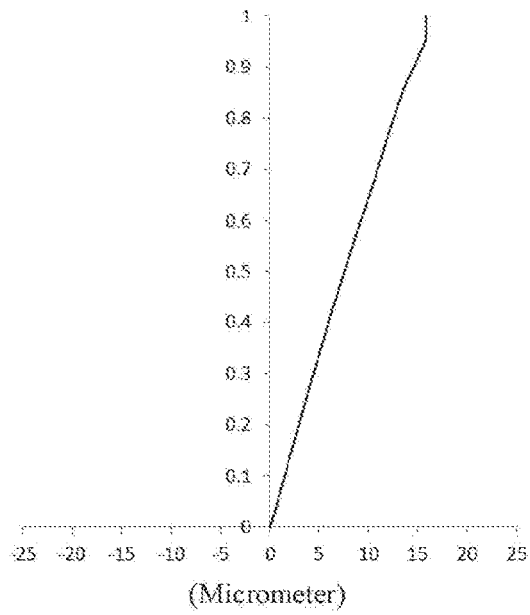
Figure 6D:
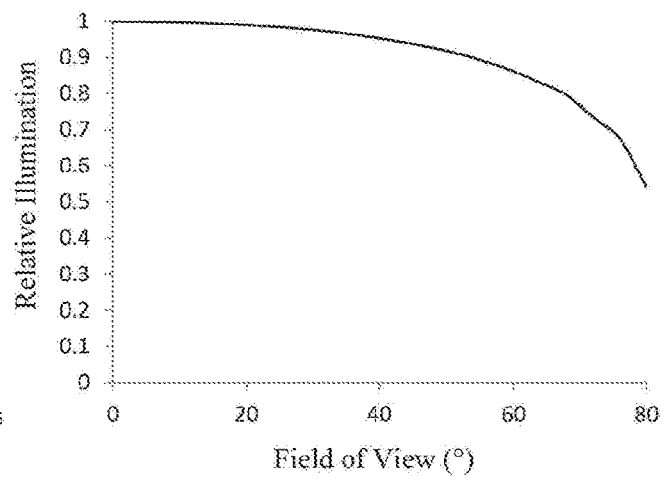

FIG. 6A illustrates a longitudinal aberration curve of the camera lens group according to example 3, representing deviations of focal points converged by light of different wavelengths after passing through the lens assembly. FIG. 6B illustrates an astigmatic curve of the camera lens group according to example 3, representing a curvature of a tangential plane and a curvature of a sagittal plane. FIG. 6C illustrates a lateral color curve of the camera lens group according to example 3, representing deviations of different image heights on an imaging plane after light passes through the lens assembly. FIG. 6D illustrates a relative illumination curve of the camera lens group according to example 3, representing the relative illumination corresponding to different FOVs. It can be seen from FIG. 6A to FIG. 6D that the camera lens group provided in example 3 can achieve a good imaging quality.

Example 4

Figure 7:
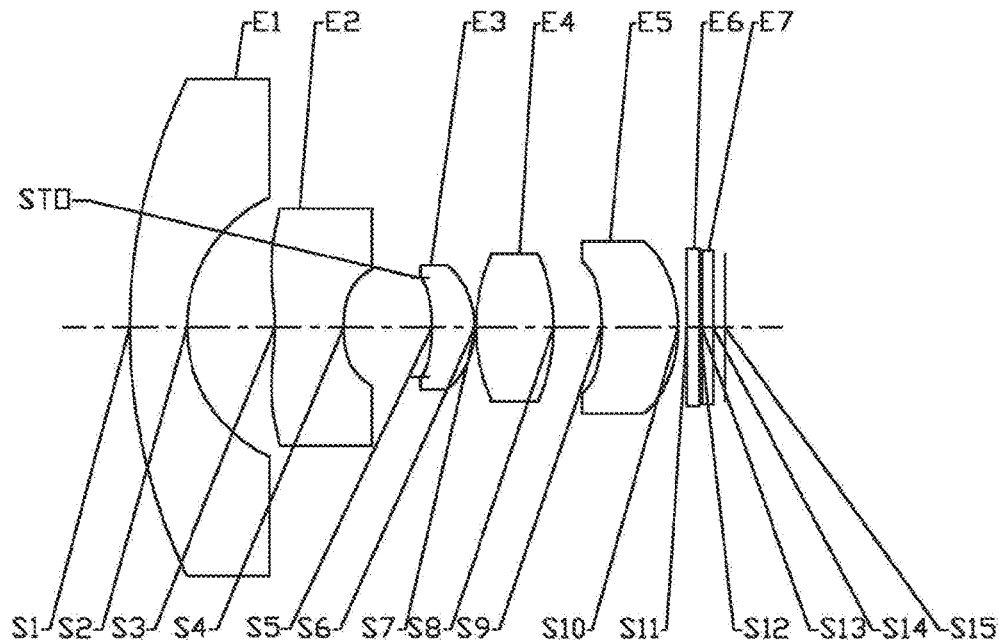
FIG. 7 is a schematic structural view of a camera lens group according to example 4 of the present disclosure.

A camera lens group according to example 4 of the present disclosure is described below with reference to FIG. 7 to FIG. 8D. FIG. 7 is a schematic structural view of the camera lens group according to example 4 of the present disclosure.

As shown in FIG. 7, the camera lens group according to an exemplary embodiment of the present disclosure includes, sequentially from an object side to an image side along an optical axis, a first lens E1, a second lens E2, a stop STO, a third lens E3, a fourth lens E4, a fifth lens E5, an optical filter E6, a protective glass E7 and an imaging plane S15.

The first lens E1 has a negative refractive power, an object-side surface S1 thereof is convex, and an image-side surface S2 thereof is concave. The second lens E2 has a negative refractive power, an object-side surface S3 thereof is concave, and an image-side surface S4 thereof is concave. The third lens E3 has a positive refractive power, an object-side surface S5 thereof is concave, and an image-side surface S6 thereof is convex. The fourth lens E4 has a positive refractive power, an object-side surface S7 thereof is convex, and an image-side surface S8 thereof is convex. The fifth lens E5 has a positive refractive power, an object-side surface S9 thereof is concave, and an image-side surface S10 thereof is convex. The optical filter E6 has an object-side surface S11 and an image-side surface S12. The protective glass E7 has an object-side surface S13 and an image-side surface S14. Light from the object sequentially passes through the respective surfaces S1 to S14 and is finally imaged on the imaging plane S15.

Optionally, the object-side surface S3 of the second lens E2 has at least one inflection point.

Optionally, at least one of the third lens E3, the fourth lens E4, and the fifth lens E5 located between the stop STO and the imaging plane S15 is glass lens. Among the glass lenses located between the stop STO and the imaging plane S15, a thermal expansion coefficient of the lens closest to the stop STO is TCE=7.1×10$^{-6}$/K at 20° C.

Table 10 shows the surface type, radius of curvature, thickness, material and conic coefficient of each lens of the camera lens group in example 4, wherein the units for the radius of curvature and the thickness are millimeter (mm).

TABLE 10

| Surface No. | Surface Type | Radius of Curvature | Thickness | Material Refractive Index | Abbe Number | Conic coefficient |
|---|---|---|---|---|---|---|
| OBJ | Spherical | Infinite | 2500.0000 | | | |
| S1 | Spherical | 24.9448 | 2.5000 | 1.73 | 54.7 | |
| S2 | Spherical | 6.2657 | 3.8491 | | | |
| S3 | Aspheric | −8.8480 | 2.9916 | 1.53 | 55.8 | −22.8252 |
| S4 | Aspheric | 6.4380 | 3.3298 | | | 3.0781 |
| STO | Spherical | Infinite | 0.5141 | | | |
| S5 | Aspheric | −7.7388 | 1.8605 | 1.62 | 23.5 | 5.8974 |
| S6 | Aspheric | −4.0231 | 0.0500 | | | 0.5041 |
| S7 | Spherical | 7.3808 | 3.4147 | 1.64 | 55.4 | |
| S8 | Spherical | −8.1044 | 2.0897 | | | |
| S9 | Aspheric | −12.5000 | 3.3346 | 1.62 | 23.5 | 12.0426 |
| S10 | Aspheric | −5.6680 | 0.3719 | | | −4.5891 |
| S11 | Spherical | Infinite | 0.5500 | 1.52 | 64.2 | |
| S12 | Spherical | Infinite | 0.1093 | | | |
| S13 | Spherical | Infinite | 0.5000 | 1.52 | 64.2 | |
| S14 | Spherical | Infinite | 0.5013 | | | |
| S15 | Spherical | Infinite | | | | |

As can be seen from Table 10, in example 4, the object-side surface and the image-side surface of the first lens E1 and the fourth lens E4 are spherical, and the object-side surface and the image-side surface of the second lens E2, the third lens E3 and the fifth lens E5 are aspheric. Table 11 shows high-order coefficients applicable to each aspheric surface in example 4, wherein the surface shape of each aspheric surface can be defined by the formula (1) given in the above example 1.

TABLE 11

| Surface No. | A4 | A6 | A8 | A10 | A12 | A14 | A16 |
|---|---|---|---|---|---|---|---|
| S3 | 4.2562E−03 | −2.7103E−04 | 1.3613E−05 | −4.5526E−07 | 8.2506E−09 | −6.4665E−11 | 0.0000E+00 |
| S4 | 1.2663E−02 | 7.5786E−04 | −7.0172E−04 | 2.8297E−04 | −5.8674E−05 | 6.6169E−06 | −3.1001E−07 |
| S5 | −2.4421E−03 | −7.6605E−04 | 4.6804E−04 | −2.7587E−04 | 8.3335E−05 | −1.3157E−05 | 8.0987E−07 |
| S6 | −2.7308E−04 | 4.2511E−05 | −3.7247E−05 | 7.9328E−06 | −8.4803E−07 | 2.3037E−08 | 9.5226E−10 |
| S9 | −5.2811E−03 | 3.0242E−04 | −2.0868E−04 | 5.9170E−05 | −9.2725E−06 | 7.5441E−07 | −2.6198E−08 |
| S10 | −5.5752E−04 | −3.4947E−04 | 7.4450E−05 | −1.3446E−05 | 1.3096E−06 | −6.4807E−08 | 1.2730E−09 |

Table 12 shows a total track length TTL of the camera lens group, a half of a diagonal length ImgH of an effective pixel area on the imaging plane S15, a half of a maximum field of view HFOV, F Number Fno, a total effective focal length f and effective focal lengths f1 to f5 of respective lens in example 4.

TABLE 12

| TTL (mm) | 25.97 | f1 (mm) | −12.35 |
|---|---|---|---|
| ImgH (mm) | 3.17 | f2 (mm) | −6.62 |
| HFOV (°) | 83.0 | f3 (mm) | 11.34 |
| Fno | 1.28 | f4 (mm) | 6.72 |
| f (mm) | 2.03 | f5 (mm) | 14.10 |

Figure 8A:
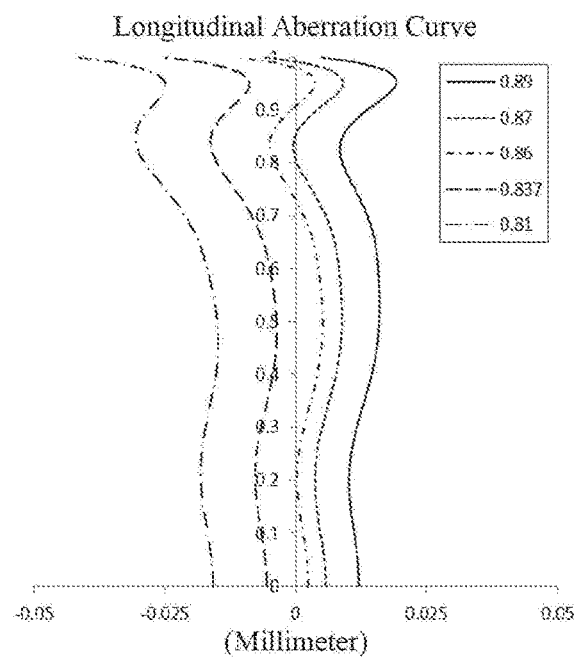
FIGS. 8A to 8D illustrate a longitudinal aberration curve, an astigmatic curve, a lateral color curve and a relative illumination curve of the camera lens group according to example 4, respectively.
Figure 8B:
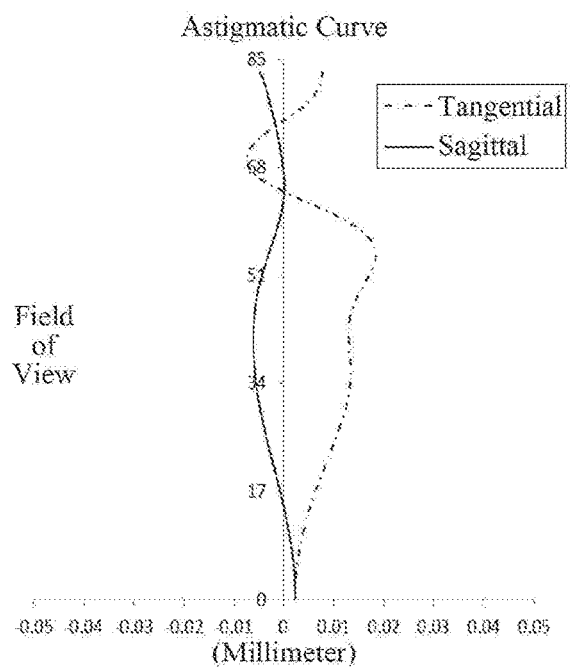
Figure 8C:
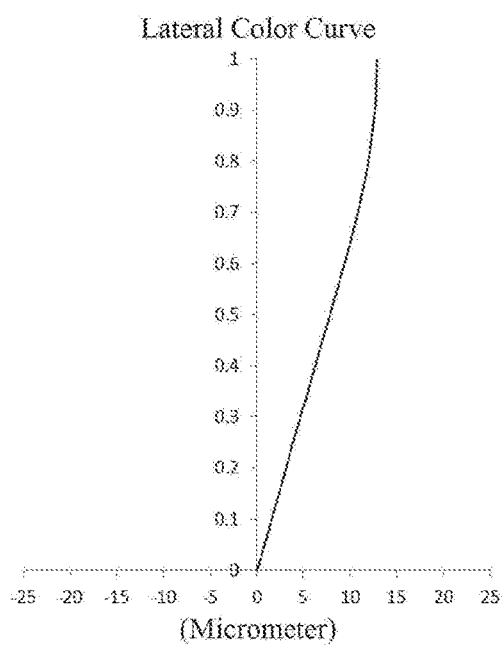
Figure 8D:
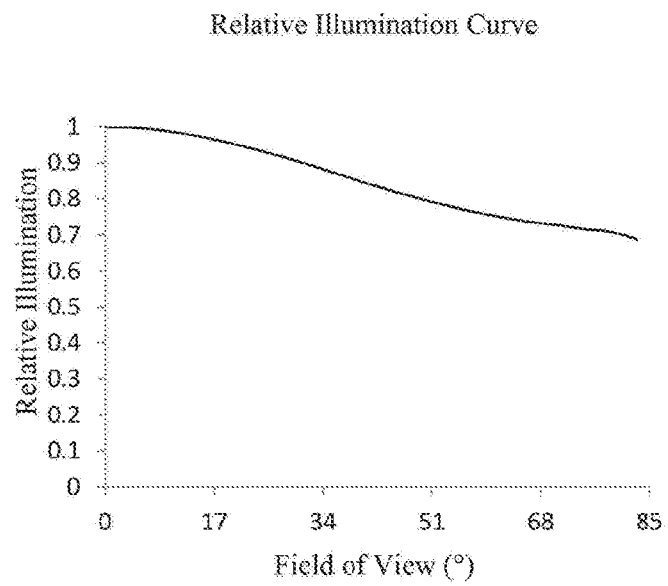

FIG. 8A illustrates a longitudinal aberration curve of the camera lens group according to example 4, representing deviations of focal points converged by light of different wavelengths after passing through the lens assembly. FIG. 8B illustrates an astigmatic curve of the camera lens group according to example 4, representing a curvature of a tangential plane and a curvature of a sagittal plane. FIG. 8C illustrates a lateral color curve of the camera lens group according to example 4, representing deviations of different image heights on an imaging plane after light passes through the lens assembly. FIG. 8D illustrates a relative illumination curve of the camera lens group according to example 4, representing the relative illumination corresponding to different FOVs. It can be seen from FIG. 8A to FIG. 8D that the camera lens group provided in example 4 can achieve a good imaging quality.

Example 5

A camera lens group according to example 5 of the present disclosure is described below with reference to FIG. 9 to FIG. 10D. FIG. 9 is a schematic structural view of the camera lens group according to example 5 of the present disclosure.

As shown in FIG. 9, the camera lens group according to an exemplary embodiment of the present disclosure includes, sequentially from an object side to an image side along an optical axis, a first lens E1, a second lens E2, a stop STO, a third lens E3, a fourth lens E4, a fifth lens E5, an optical filter E6, a protective glass E7 and an imaging plane S15.

The first lens E1 has a negative refractive power, an object-side surface S1 thereof is convex, and an image-side surface S2 thereof is concave. The second lens E2 has a negative refractive power, an object-side surface S3 thereof is concave, and an image-side surface S4 thereof is concave. The third lens E3 has a positive refractive power, an object-side surface S5 thereof is concave, and an image-side surface S6 thereof is convex. The fourth lens E4 has a positive refractive power, an object-side surface S7 thereof is convex, and an image-side surface S8 thereof is convex. The fifth lens E5 has a positive refractive power, an object-side surface S9 thereof is convex, and an image-side surface S10 thereof is concave. The optical filter E6 has an object-side surface S11 and an image-side surface S12. The protective glass E7 has an object-side surface S13 and an image-side surface S14. Light from the object sequentially passes through the respective surfaces S1 to S14 and is finally imaged on the imaging plane S15.

Optionally, the object-side surface S3 of the second lens E2 has at least one inflection point.

Optionally, at least one of the third lens E3, the fourth lens E4, and the fifth lens E5 located between the stop STO and the imaging plane S15 is glass lens. Among the glass lenses located between the stop STO and the imaging plane S15, a thermal expansion coefficient of the lens closest to the stop STO is TCE=7.1×10$^{-6}$/K at 20° C.

Table 13 shows the surface type, radius of curvature, thickness, material and conic coefficient of each lens of the camera lens group in example 5, wherein the units for the radius of curvature and the thickness are millimeter (mm).

TABLE 13

| Surface No. | Surface Type | Radius of Curvature | Thickness | Material Refractive Index | Material Abbe Number | Conic coefficient |
|---|---|---|---|---|---|---|
| OBJ | Spherical | Infinite | 2500.0000 | | | |
| S1 | Spherical | 20.8694 | 1.9815 | 1.73 | 54.7 | |
| S2 | Spherical | 7.5661 | 4.9161 | | | |
| S3 | Aspheric | −6.3201 | 1.9517 | 1.53 | 55.8 | −15.5250 |
| S4 | Aspheric | 7.8372 | 3.6546 | | | 6.5977 |
| STO | Spherical | Infinite | 0.4375 | | | |
| S5 | Aspheric | −6.5060 | 1.4409 | 1.62 | 23.5 | 7.1910 |
| S6 | Aspheric | −4.1398 | 0.0609 | | | 0.9328 |
| S7 | Spherical | 7.8667 | 2.8736 | 1.64 | 55.4 | |
| S8 | Spherical | −8.4219 | 2.2736 | | | |
| S9 | Aspheric | 4.9965 | 2.4277 | 1.62 | 23.5 | −4.4963 |
| S10 | Aspheric | 10.0000 | 0.3275 | | | 4.6831 |

TABLE 13-continued

| Surface No. | Surface Type | Radius of Curvature | Thickness | Material Refractive Index | Abbe Number | Conic coefficient |
|---|---|---|---|---|---|---|
| S11 | Spherical | Infinite | 0.5500 | 1.52 | 64.2 | |
| S12 | Spherical | Infinite | 0.1021 | | | |
| S13 | Spherical | Infinite | 0.5000 | 1.52 | 64.2 | |
| S14 | Spherical | Infinite | 0.5013 | | | |
| S15 | Spherical | Infinite | | | | |

As can be seen from Table 13, in example 5, the object-side surface and the image-side surface of the first lens E1 and the fourth lens E4 are spherical, and the object-side surface and the image-side surface of the second lens E2, the third lens E3 and the fifth lens E5 are aspheric. Table 14 shows high-order coefficients applicable to each aspheric surface in example 5, wherein the surface shape of each aspheric surface can be defined by the formula (1) given in the above example 1.

TABLE 14

| Surface No. | A4 | A6 | A8 | A10 | A12 | A14 | A16 |
|---|---|---|---|---|---|---|---|
| S3 | 4.3910E−03 | −2.8406E−04 | 1.4059E−05 | −4.5451E−07 | 8.2506E−09 | −6.4665E−11 | 1.2270E−34 |
| S4 | 1.3558E−02 | 2.8411E−04 | −6.1272E−04 | 2.6923E−04 | −5.8674E−05 | 6.6169E−06 | −3.1001E−07 |
| S5 | −5.0343E−03 | −8.9043E−04 | 4.2417E−04 | −2.8424E−04 | 8.3335E−05 | −1.3157E−05 | 8.0987E−07 |
| S6 | −2.2297E−03 | −7.7155E−05 | −3.8480E−05 | 4.8875E−06 | −4.4803E−07 | 2.3037E−08 | 9.5226E−10 |
| S9 | −1.1173E−03 | 2.2878E−04 | −2.4623E−04 | 6.0406E−05 | −9.2725E−06 | 7.5441E−07 | −2.6198E−08 |
| S10 | −5.4129E−03 | −4.1618E−04 | 8.1721E−05 | −1.4022E−05 | 1.3096E−06 | −6.4807E−08 | 1.2730E−09 |

Table 15 shows a total track length TTL of the camera lens group, a half of a diagonal length ImgH of an effective pixel area on the imaging plane S15, a half of a maximum field of view HFOV, F Number Fno, a total effective focal length f and effective focal lengths f1 to f5 of respective lens in example 5.

TABLE 15

| TTL (mm) | 24.00 | f1 (mm) | −17.64 |
|---|---|---|---|
| ImgH (mm) | 3.14 | f2 (mm) | −6.33 |
| HFOV (°) | 100.0 | f3 (mm) | 14.89 |
| Fno | 1.28 | f4 (mm) | 6.94 |
| f (mm) | 1.85 | f5 (mm) | 13.59 |

Figure 10C:
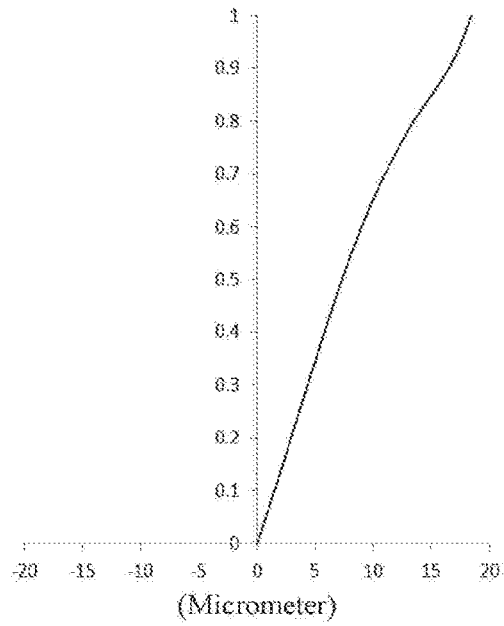
Figure 10D:
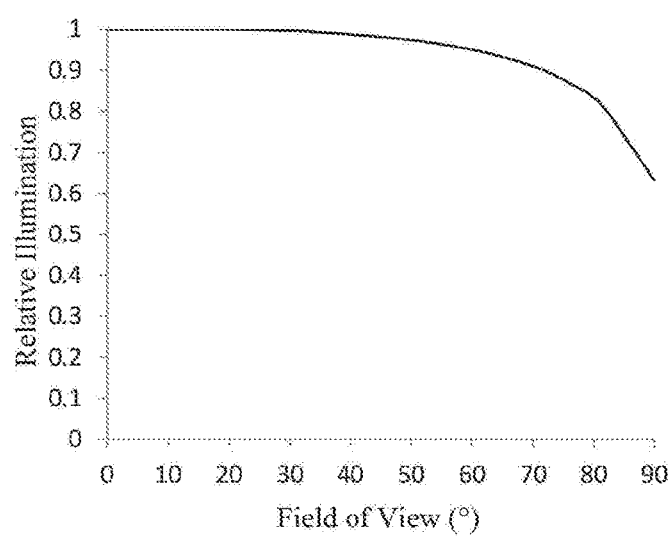

FIG. 10A illustrates a longitudinal aberration curve of the camera lens group according to example 5, representing deviations of focal points converged by light of different wavelengths after passing through the lens assembly. FIG. 10B illustrates an astigmatic curve of the camera lens group according to example 5, representing a curvature of a tangential plane and a curvature of a sagittal plane. FIG. 10C illustrates a lateral color curve of the camera lens group according to example 5, representing deviations of different image heights on an imaging plane after light passes through the lens assembly. FIG. 10D illustrates a relative illumination curve of the camera lens group according to example 5, representing the relative illumination corresponding to different FOVs. It can be seen from FIG. 10A to FIG. 10D that the camera lens group provided in example 5 can achieve a good imaging quality.

Example 6

Figure 11:
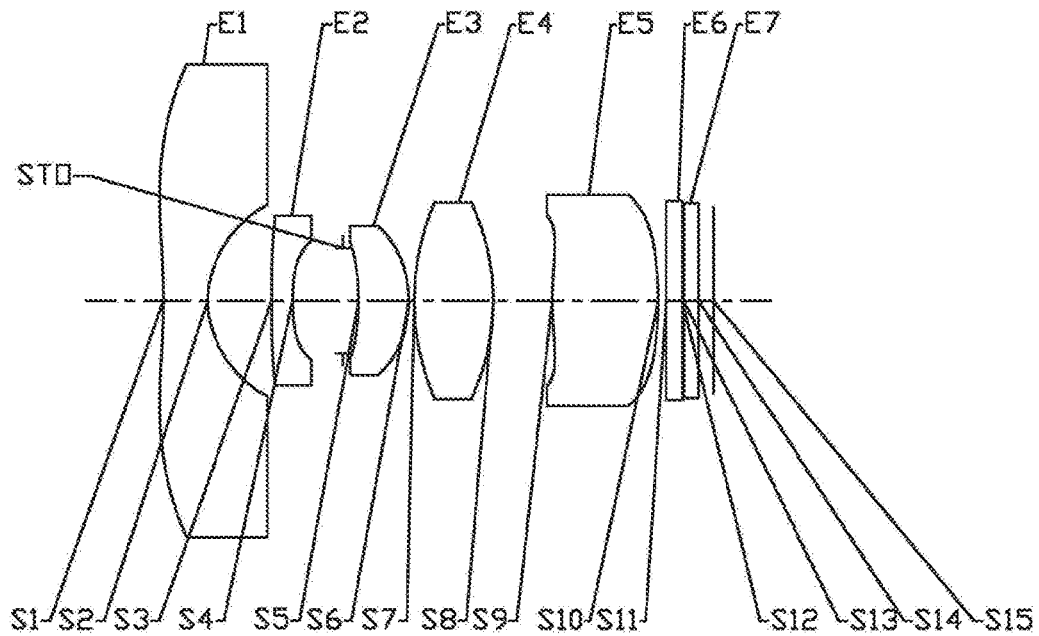
FIG. 11 is a schematic structural view of a camera lens group according to example 6 of the present disclosure.

A camera lens group according to example 6 of the present disclosure is described below with reference to FIG. 11 to FIG. 12D. FIG. 11 is a schematic structural view of the camera lens group according to example 6 of the present disclosure.

As shown in FIG. 11, the camera lens group according to an exemplary embodiment of the present disclosure includes, sequentially from an object side to an image side along an optical axis, a first lens E1, a second lens E2, a stop STO, a third lens E3, a fourth lens E4, a fifth lens E5, an optical filter E6, a protective glass E7 and an imaging plane S15.

The first lens E1 has a negative refractive power, an object-side surface S1 thereof is concave, and an image-side surface S2 thereof is concave. The second lens E2 has a negative refractive power, an object-side surface S3 thereof is concave, and an image-side surface S4 thereof is concave. The third lens E3 has a positive refractive power, an object-side surface S5 thereof is concave, and an image-side surface S6 thereof is convex. The fourth lens E4 has a positive refractive power, an object-side surface S7 thereof is convex, and an image-side surface S8 thereof is convex. The fifth lens E5 has a positive refractive power, an object-side surface S9 thereof is convex, and an image-side surface S10 thereof is convex. The optical filter E6 has an object-side surface S11 and an image-side surface S12. The protective glass E7 has an object-side surface S13 and an image-side surface S14. Light from the object sequentially passes through the respective surfaces S1 to S14 and is finally imaged on the imaging plane S15.

Optionally, the object-side surface S3 of the second lens E2 has at least one inflection point.

Optionally, at least one of the third lens E3, the fourth lens E4, and the fifth lens E5 located between the stop STO and the imaging plane S15 is glass lens. Among the glass lenses located between the stop STO and the imaging plane S15, a thermal expansion coefficient of the lens closest to the stop STO is TCE=7.1×10$^{-6}$/K at 20° C.

Table 16 shows the surface type, radius of curvature, thickness, material and conic coefficient of each lens of the camera lens group in example 6, wherein the units for the radius of curvature and the thickness are millimeter (mm).

TABLE 6

| Surface No. | Surface Type | Radius of Curvature | Thickness | Material Refractive Index | Abbe Number | Conic coefficient |
|---|---|---|---|---|---|---|
| OBJ | Spherical | Infinite | 2500.0000 | | | |
| S1 | Aspheric | −20.0000 | 1.5000 | 1.53 | 55.9 | −99.0000 |
| S2 | Aspheric | 3.0890 | 2.1977 | | | −0.6169 |
| S3 | Aspheric | −89.9576 | 0.7000 | 1.53 | 55.8 | 6.7597 |
| S4 | Aspheric | 7.9710 | 1.7033 | | | 1.3878 |
| STO | Spherical | Infinite | 0.5402 | | | |
| S5 | Aspheric | −9.0533 | 1.7049 | 1.62 | 23.5 | 4.4684 |
| S6 | Aspheric | −4.0174 | 0.1801 | | | 0.7073 |
| S7 | Spherical | 8.4206 | 2.6939 | 1.64 | 55.4 | |
| S8 | Spherical | −7.8990 | 2.0205 | | | |
| S9 | Aspheric | 12.1728 | 3.5941 | 1.62 | 23.5 | −14.9545 |
| S10 | Aspheric | −10.0585 | 0.2686 | | | −65.0103 |
| S11 | Spherical | Infinite | 0.5500 | 1.52 | 64.2 | |
| S12 | Spherical | Infinite | 0.0500 | | | |
| S13 | Spherical | Infinite | 0.5000 | 1.52 | 64.2 | |
| S14 | Spherical | Infinite | 0.5083 | | | |
| S15 | Spherical | Infinite | | | | |

As can be seen from Table 16, in example 6, the object-side surface and the image-side surface of the fourth lens E4 are spherical, and the object-side surface and the image-side surface of the first lens E1, the second lens E2, the third lens E3 and the fifth lens E5 are aspheric. Table 17 shows high-order coefficients applicable to each aspheric surface in example 6, wherein the surface shape of each aspheric surface can be defined by the formula (1) given in the above example 1.

TABLE 17

| Surface No. | A4 | A6 | A8 | A10 | A12 | A14 | A16 |
|---|---|---|---|---|---|---|---|
| S1 | 5.9912E−04 | −6.0334E−06 | 2.7935E−08 | 3.3796E−11 | 0.0000E+00 | 0.0000E+00 | 0.0000E+00 |
| S2 | −1.5323E−03 | 3.7943E−06 | 7.5651E−06 | 1.2490E−06 | 0.0000E+00 | 0.0000E+00 | 0.0000E+00 |
| S3 | 4.6269E−03 | −2.3413E−04 | −7.7858E−06 | −1.8065E−07 | 8.2506E−09 | −6.4665E−11 | 0.0000E+00 |
| S4 | 1.6592E−02 | 1.6839E−03 | −8.0636E−04 | 3.2694E−04 | −5.8674E−05 | 6.6169E−06 | −3.1001E−07 |
| S5 | −2.1859E−03 | −7.9392E−04 | 4.6212E−04 | −2.7036E−04 | 8.3335E−05 | −1.3157E−05 | 8.0987E−07 |
| S6 | −3.9551E−04 | 3.6198E−05 | −3.8357E−05 | 8.2957E−06 | −8.4803E−07 | 2.3037E−08 | 9.5226E−10 |
| S9 | −3.3723E−03 | 1.3953E−04 | −2.1467E−04 | 5.8456E−05 | −9.2725E−06 | 7.5441E−07 | −2.6198E−08 |
| S10 | −1.3896E−03 | −4.5518E−04 | 7.8302E−05 | −1.3412E−05 | 1.3096E−06 | −6.4807E−08 | 1.2730E−09 |

Table 18 shows a total track length TTL of the camera lens group, a half of a diagonal length ImgH of an effective pixel area on the imaging plane S15, a half of a maximum field of view HFOV, F Number Fno, a total effective focal length f and effective focal lengths f1 to f5 of respective lens in example 6.

TABLE 18

| TTL (mm) | 18.71 | f1 (mm) | −4.96 |
|---|---|---|---|
| ImgH (mm) | 3.17 | f2 (mm) | −13.85 |
| HFOV (°) | 86.4 | f3 (mm) | 10.31 |
| Fno | 1.26 | f4 (mm) | 6.92 |
| f (mm) | 2.00 | f5 (mm) | 9.47 |

Figure 12A:
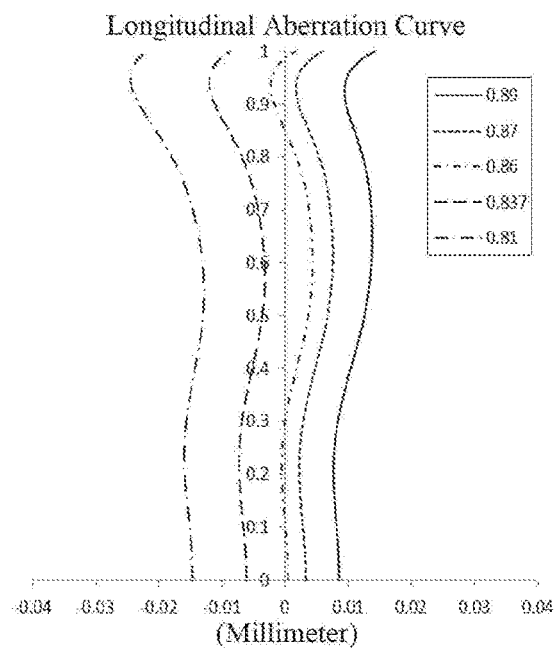
FIGS. 12A to 12D illustrate a longitudinal aberration curve, an astigmatic curve, a lateral color curve and a relative illumination curve of the camera lens group according to example 6, respectively.
Figure 12B:
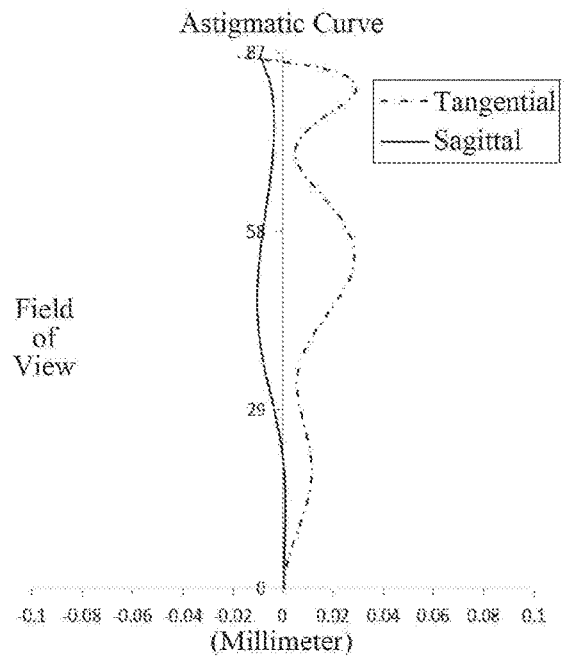
Figure 12C:
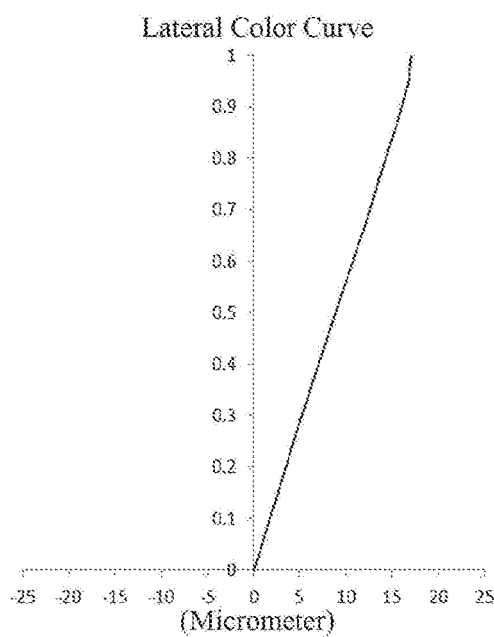
Figure 12D:
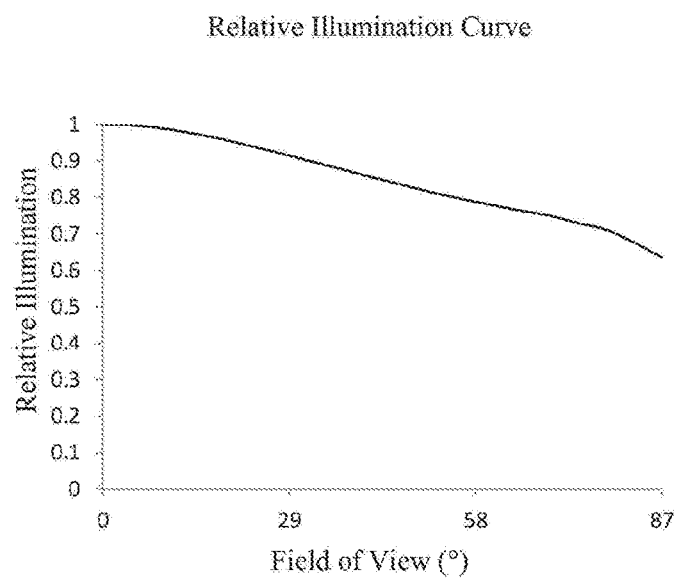

FIG. 12A illustrates a longitudinal aberration curve of the camera lens group according to example 6, representing deviations of focal points converged by light of different wavelengths after passing through the lens assembly. FIG. 12B illustrates an astigmatic curve of the camera lens group according to example 6, representing a curvature of a tangential plane and a curvature of a sagittal plane. FIG. 12C illustrates a lateral color curve of the camera lens group according to example 6, representing deviations of different image heights on an imaging plane after light passes through the lens assembly. FIG. 12D illustrates a relative illumination curve of the camera lens group according to example 6, representing the relative illumination corresponding to different FOVs. It can be seen from FIG. 12A to FIG. 12D that the camera lens group provided in example 6 can achieve a good imaging quality.

Example 7

Figure 13:
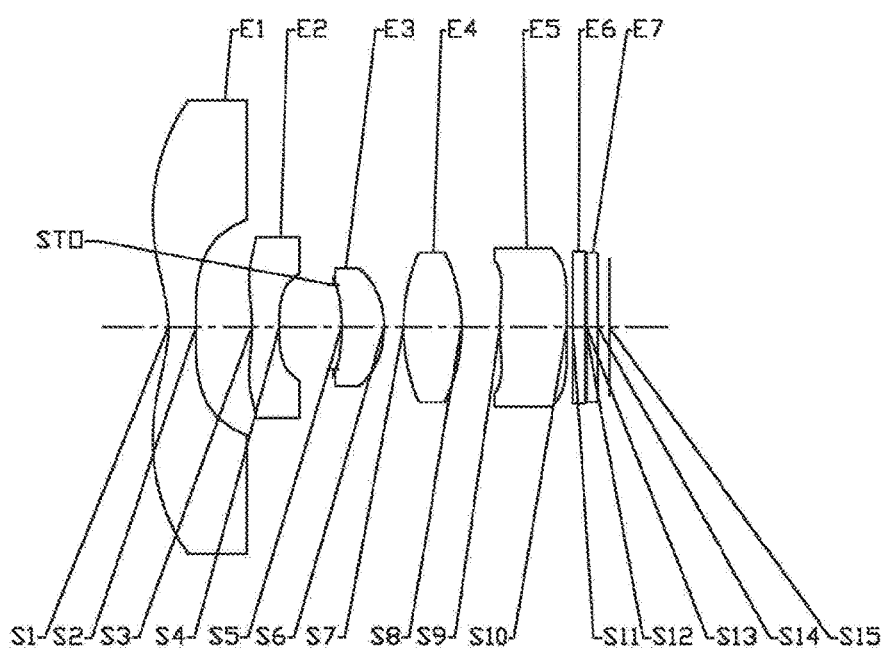
FIG. 13 is a schematic structural view of a camera lens group according to example 7 of the present disclosure.

A camera lens group according to example 7 of the present disclosure is described below with reference to FIG. 13 to FIG. 14D. FIG. 13 is a schematic structural view of the camera lens group according to example 7 of the present disclosure.

As shown in FIG. 13, the camera lens group according to an exemplary embodiment of the present disclosure includes, sequentially from an object side to an image side along an optical axis, a first lens E1, a second lens E2, a stop STO, a third lens E3, a fourth lens E4, a fifth lens E5, an optical filter E6, a protective glass E7 and an imaging plane S15.

The first lens E1 has a negative refractive power, an object-side surface S1 thereof is concave, and an image-side surface S2 thereof is flat. The second lens E2 has a negative refractive power, an object-side surface S3 thereof is concave, and an image-side surface S4 thereof is concave. The third lens E3 has a positive refractive power, an object-side surface S5 thereof is concave, and an image-side surface S6 thereof is convex. The fourth lens E4 has a positive refractive power, an object-side surface S7 thereof is convex, and an image-side surface S8 thereof is convex. The fifth lens E5 has a positive refractive power, an object-side surface S9 thereof is convex, and an image-side surface S10 thereof is concave. The optical filter E6 has an object-side surface S11 and an image-side surface S12. The protective glass E7 has an object-side surface S13 and an image-side surface S14. Light from the object sequentially passes through the respective surfaces S1 to S14 and is finally imaged on the imaging plane S15.

Optionally, the object-side surface S3 of the second lens E2 has at least one inflection point.

Optionally, at least one of the third lens E3, the fourth lens E4, and the fifth lens E5 located between the stop STO and the imaging plane S15 is glass lens. Among the glass lenses located between the stop STO and the imaging plane S15, a thermal expansion coefficient of the lens closest to the stop STO is TCE=$7.1 \times 10^{-6}$/K at 20° C.

Table 19 shows the surface type, radius of curvature, thickness, material and conic coefficient of each lens of the camera lens group in example 7, wherein the units for the radius of curvature and the thickness are millimeter (mm).

Table 21 shows a total track length TTL of the camera lens group, a half of a diagonal length ImgH of an effective pixel area on the imaging plane S15, a half of a maximum field of view HFOV, F Number Fno, a total effective focal length f and effective focal lengths f1 to f5 of respective lens in example 7.

TABLE 21

| TTL (mm)  | 19.42 | f1 (mm) | −8.96  |
| ImgH (mm) | 3.05  | f2 (mm) | −10.53 |
| HFOV (°)  | 78.5  | f3 (mm) | 9.57   |
| Fno       | 1.28  | f4 (mm) | 6.87   |
| f (mm)    | 2.15  | f5 (mm) | 28.27  |

Figures 14A, 14B:
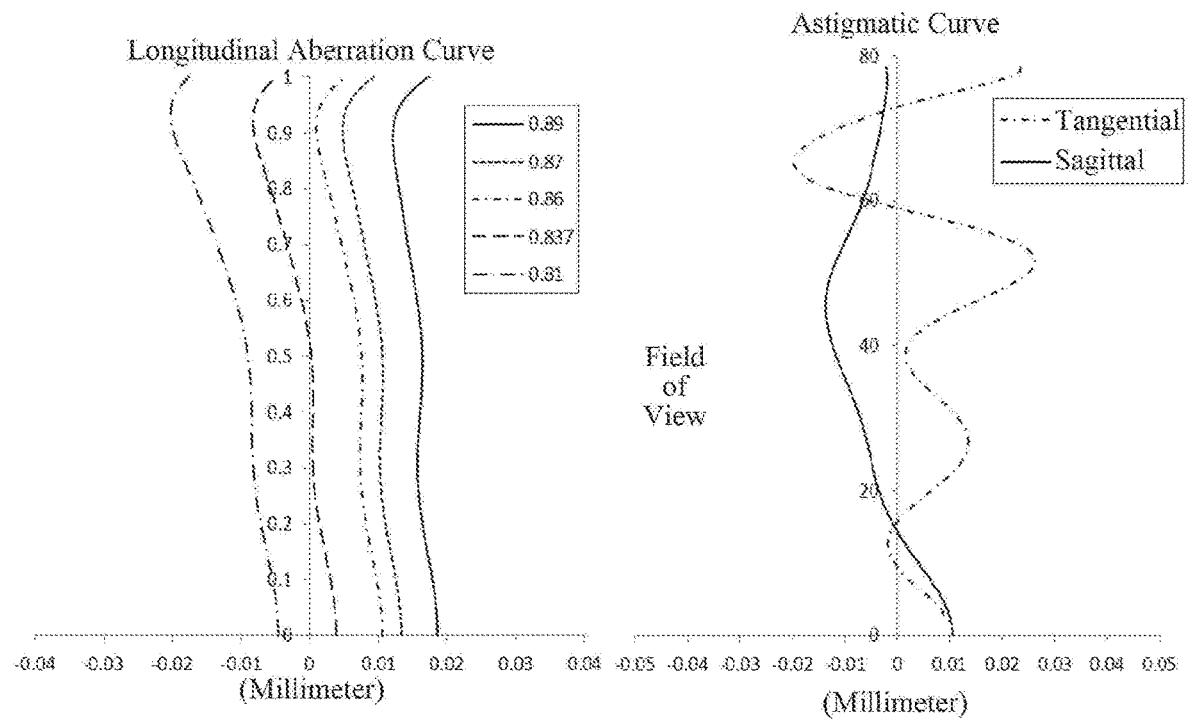
FIGS. 14A to 14D illustrate a longitudinal aberration curve, an astigmatic curve, a lateral color curve and a relative illumination curve of the camera lens group according to example 7, respectively.
Figure 14C:
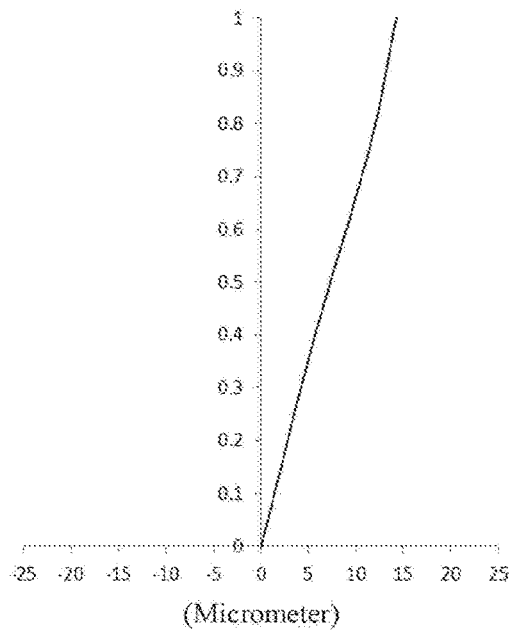
Figure 14D:
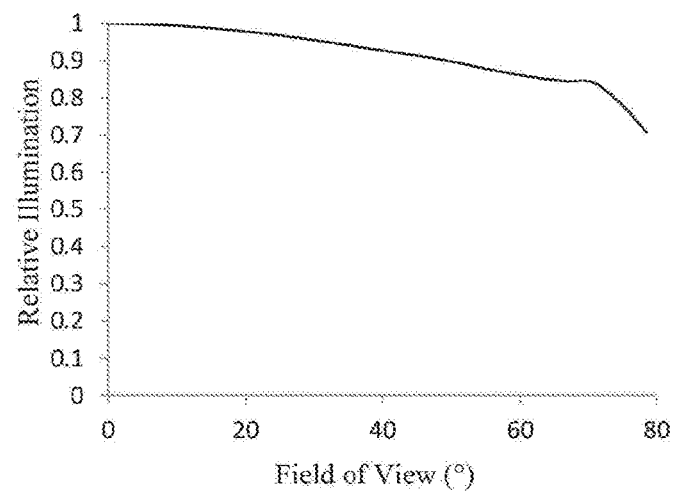

FIG. 14A illustrates a longitudinal aberration curve of the camera lens group according to example 7, representing deviations of focal points converged by light of different wavelengths after passing through the lens assembly. FIG. 14B illustrates an astigmatic curve of the camera lens group according to example 7, representing a curvature of a tangential plane and a curvature of a sagittal plane. FIG. 14C illustrates a lateral color curve of the camera lens group

TABLE 19

| Surface No. | Surface Type | Radius of Curvature | Thickness | Material Refractive Index | Abbe Number | Conic coefficient |
|---|---|---|---|---|---|---|
| OBJ | Spherical | Infinite | 2500.0000 | | | |
| S1  | Aspheric  | −4.7253  | 1.2000    | 1.53 | 55.9 | −11.4502 |
| S2  | Aspheric  | Infinite | 2.4637    |      |      | 87.8544  |
| S3  | Aspheric  | −8.0825  | 1.2028    | 1.53 | 55.8 | −13.7954 |
| S4  | Aspheric  | 18.6855  | 2.3718    |      |      | 47.0075  |
| STO | Spherical | Infinite | 0.3681    |      |      |          |
| S5  | Aspheric  | −10.1466 | 1.8783    | 1.62 | 23.5 | 7.1912   |
| S6  | Aspheric  | −4.0100  | 0.8480    |      |      | 0.6228   |
| S7  | Spherical | 8.4132   | 2.5813    | 1.64 | 55.4 |          |
| S8  | Spherical | −7.8237  | 1.6924    |      |      |          |
| S9  | Aspheric  | 14.4136  | 2.9334    | 1.62 | 23.5 | −36.6214 |
| S10 | Aspheric  | 74.8651  | 0.2732    |      |      | −51.9719 |
| S11 | Spherical | Infinite | 0.5500    | 1.52 | 64.2 |          |
| S12 | Spherical | Infinite | 0.0507    |      |      |          |
| S13 | Spherical | Infinite | 0.5000    | 1.52 | 64.2 |          |
| S14 | Spherical | Infinite | 0.5013    |      |      |          |
| S15 | Spherical | Infinite |           |      |      |          |

As can be seen from Table 19, in example 7, the object-side surface and the image-side surface of the fourth lens E4 are spherical, and the object-side surface and the image-side surface of the first lens E1, the second lens E2, the third lens E3 and the fifth lens E5 are aspheric. Table 20 shows high-order coefficients applicable to each aspheric surface in example 7, wherein the surface shape of each aspheric surface can be defined by the formula (1) given in the above example 1.

according to example 7, representing deviations of different image heights on an imaging plane after light passes through the lens assembly. FIG. 14D illustrates a relative illumination curve of the camera lens group according to example 7, representing the relative illumination corresponding to different FOVs. It can be seen from FIG. 14A to FIG. 14D that the camera lens group provided in example 7 can achieve a good imaging quality.

TABLE 20

| Surface No. | A4 | A6 | A8 | A10 | A12 | A14 | A16 |
|---|---|---|---|---|---|---|---|
| S1  | 1.0937E−03  | −1.9605E−05 | 2.4717E−07  | −2.0010E−09 | 9.1486E−12  | −1.6507E−14 | 0.0000E+00  |
| S2  | 8.2240E−03  | −1.0990E−03 | 1.1878E−04  | −7.1968E−06 | 2.3973E−07  | −3.2605E−09 | 0.0000E+00  |
| S3  | 6.5970E−03  | −2.0558E−04 | 2.5133E−06  | −2.7821E−07 | 8.2506E−09  | −6.4665E−11 | 0.0000E+00  |
| S4  | 1.6652E−02  | 1.7172E−03  | −8.2107E−04 | 3.0038E−04  | −5.8674E−05 | 6.6169E−06  | −3.1001E−07 |
| S5  | −3.4507E−03 | −8.1395E−04 | 4.3947E−04  | −2.7718E−04 | 8.3335E−05  | −1.3157E−05 | 8.0987E−07  |
| S6  | −4.3996E−04 | 4.3268E−05  | −4.0590E−05 | 7.9452E−06  | −8.4803E−07 | 2.3037E−08  | 9.5226E−10  |
| S9  | −3.3115E−03 | 1.4211E−04  | −2.2087E−04 | 5.9180E−05  | −9.2725E−06 | 7.5441E−07  | −2.6198E−08 |
| S10 | −1.4974E−03 | −5.3869E−04 | 7.6416E−05  | −1.3185E−05 | 1.3096E−06  | −6.4807E−08 | 1.2730E−09  |

Example 8

Figure 15:
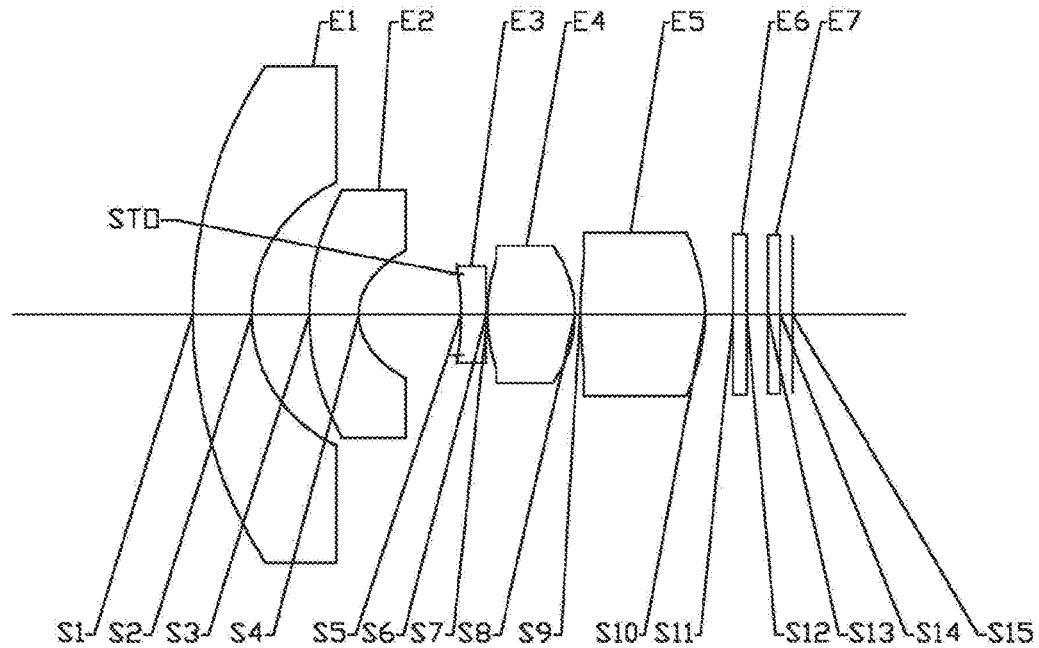
FIG. 15 is a schematic structural view of a camera lens group according to example 8 of the present disclosure.

A camera lens group according to example 8 of the present disclosure is described below with reference to FIG. 15 to FIG. 16D. FIG. 15 is a schematic structural view of the camera lens group according to example 8 of the present disclosure.

As shown in FIG. 15, the camera lens group according to an exemplary embodiment of the present disclosure includes, sequentially from an object side to an image side along an optical axis, a first lens E1, a second lens E2, a stop STO, a third lens E3, a fourth lens E4, a fifth lens E5, an optical filter E6, a protective glass E7 and an imaging plane S15.

The first lens E1 has a negative refractive power, an object-side surface S1 thereof is convex, and an image-side surface S2 thereof is concave. The second lens E2 has a negative refractive power, an object-side surface S3 thereof is convex, and an image-side surface S4 thereof is concave. The third lens E3 has a negative refractive power, an object-side surface S5 thereof is concave, and an image-side surface S6 thereof is convex. The fourth lens E4 has a positive refractive power, an object-side surface S7 thereof is convex, and an image-side surface S8 thereof is convex. The fifth lens E5 has a positive refractive power, an object-side surface S9 thereof is convex, and an image-side surface S10 thereof is convex. The optical filter E6 has an object-side surface S11 and an image-side surface S12. The protective glass E7 has an object-side surface S13 and an image-side surface S14. Light from the object sequentially passes through the respective surfaces S1 to S14 and is finally imaged on the imaging plane S15.

Optionally, at least one of the third lens E3, the fourth lens E4, and the fifth lens E5 located between the stop STO and the imaging plane S15 is glass lens. Among the glass lenses located between the stop STO and the imaging plane S15, a thermal expansion coefficient of the lens closest to the stop STO is $TCE=7.1\times10^{-6}/K$ at $20°$ C.

Table 22 shows the surface type, radius of curvature, thickness, material and conic coefficient of each lens of the camera lens group in example 8, wherein the units for the radius of curvature and the thickness are millimeter (mm).

TABLE 22

| Surface No. | Surface Type | Radius of Curvature | Thickness | Material Refractive Index | Abbe Number | Conic coefficient |
|---|---|---|---|---|---|---|
| OBJ | Spherical | Infinite | 2500.0000 | | | |
| S1 | Spherical | 18.5244 | 2.3846 | 1.73 | 54.7 | |
| S2 | Spherical | 5.8464 | 2.3116 | | | |
| S3 | Aspheric | 14.2857 | 1.9711 | 1.53 | 55.8 | 1.1616 |
| S4 | Aspheric | 2.2625 | 3.9043 | | | −1.3263 |
| STO | Spherical | Infinite | 0.1830 | | | |
| S5 | Aspheric | −13.5614 | 1.0000 | 1.62 | 23.5 | 18.3755 |
| S6 | Aspheric | −286.3604 | 0.0521 | | | 99.0000 |
| S7 | Spherical | 7.1157 | 3.5237 | 1.64 | 55.4 | |
| S8 | Spherical | −4.7490 | 0.2034 | | | |
| S9 | Aspheric | 12.2930 | 5.0000 | 1.62 | 23.5 | −34.9577 |
| S10 | Aspheric | −5.7269 | 1.1051 | | | −2.5283 |
| S11 | Spherical | Infinite | 0.5500 | 1.52 | 64.2 | |
| S12 | Spherical | Infinite | 0.8425 | | | |
| S13 | Spherical | Infinite | 0.5000 | 1.52 | 64.2 | |
| S14 | Spherical | Infinite | 0.5013 | | | |
| S15 | Spherical | Infinite | | | | |

As can be seen from Table 22, in example 8, the object-side surface and the image-side surface of the first lens E1 and the fourth lens E4 are spherical, and the object-side surface and the image-side surface of the second lens E2, the third lens E3 and the fifth lens E5 are aspheric. Table 23 shows high-order coefficients applicable to each aspheric surface in example 8, wherein the surface shape of each aspheric surface can be defined by the formula (1) given in the above example 1.

TABLE 23

| Surface No. | A4 | A6 | A8 | A10 | A12 | A14 | A16 |
|---|---|---|---|---|---|---|---|
| S3 | 3.3370E−03 | −3.0620E−04 | 1.5584E−05 | −4.7500E−07 | 8.2506E−09 | −6.4665E−11 | 0.0000E+00 |
| S4 | 1.3808E−02 | 7.9281E−04 | −8.4432E−04 | 2.9196E−04 | −5.8674E−05 | 6.6169E−06 | −3.1001E−07 |
| S5 | −2.8698E−03 | −7.3551E−04 | 5.5858E−04 | −2.7442E−04 | 8.3335E−05 | −1.3157E−05 | 8.0987E−07 |
| S6 | −4.3648E−04 | −1.0574E−05 | 4.3231E−05 | 7.4343E−06 | −8.4803E−07 | 2.3037E−08 | 9.5226E−10 |
| S9 | −5.2212E−04 | 3.1905E−04 | −2.2961E−04 | 6.0862E−05 | −9.2725E−06 | 7.5441E−07 | −2.6198E−08 |
| S10 | 2.2623E−03 | −3.7792E−04 | 8.1992E−05 | −1.3676E−05 | 1.3096E−06 | −6.4807E−08 | 1.2730E−09 |

Table 24 shows a total track length TTL of the camera lens group, a half of a diagonal length ImgH of an effective pixel area on the imaging plane S15, a half of a maximum field of view HFOV, F Number Fno, a total effective focal length f and effective focal lengths f1 to f5 of respective lens in example 8.

TABLE 24

| TTL (mm) | 24.03 | f1 (mm) | −12.92 |
|---|---|---|---|
| ImgH (mm) | 3.17 | f2 (mm) | −5.40 |
| HFOV (°) | 83.0 | f3 (mm) | −23.00 |
| Fno | 1.28 | f4 (mm) | 5.12 |
| f (mm) | 1.70 | f5 (mm) | 7.05 |

Figure 16A:
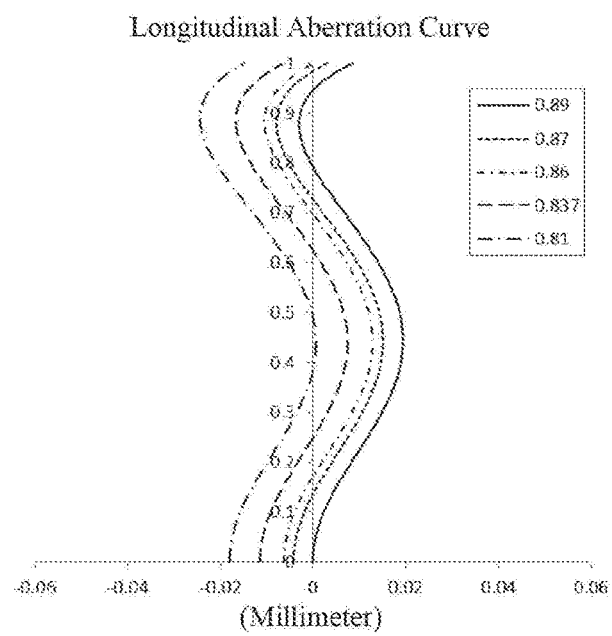
FIGS. 16A to 16D illustrate a longitudinal aberration curve, an astigmatic curve, a lateral color curve and a relative illumination curve of the camera lens group according to example 8, respectively.
Figure 16B:
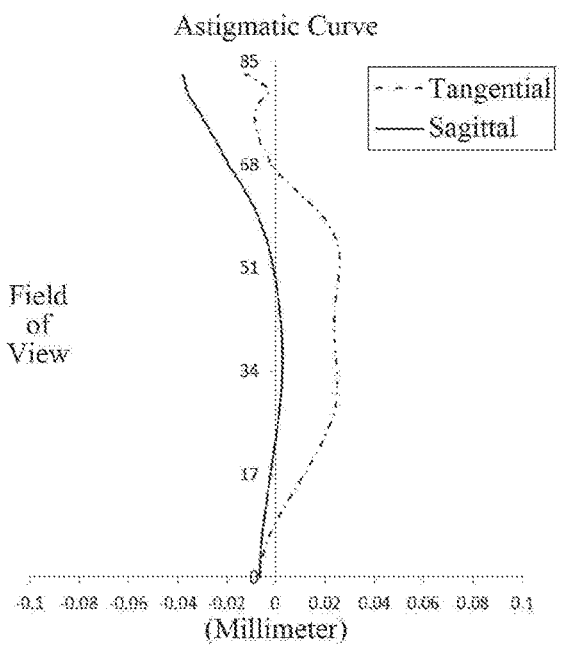
Figure 16C:
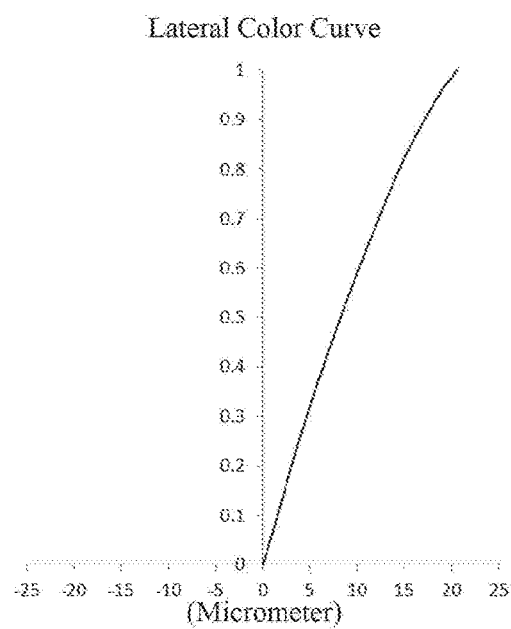
Figure 16D:
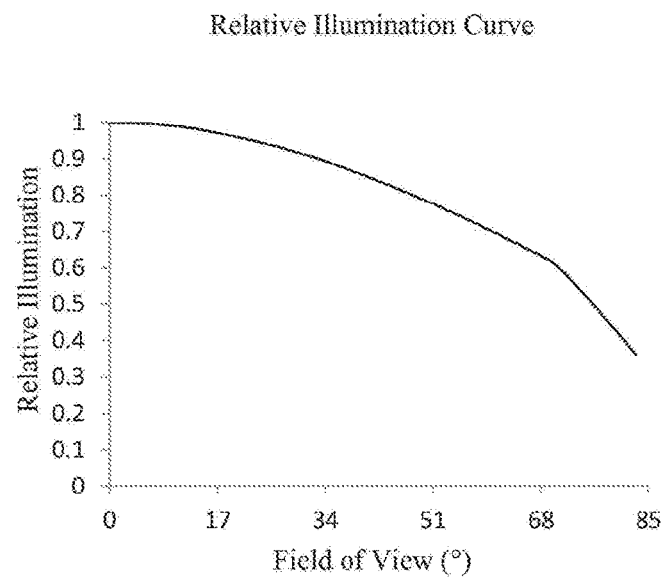

FIG. 16A illustrates a longitudinal aberration curve of the camera lens group according to example 8, representing deviations of focal points converged by light of different wavelengths after passing through the lens assembly. FIG. 16B illustrates an astigmatic curve of the camera lens group according to example 8, representing a curvature of a tangential plane and a curvature of a sagittal plane. FIG. 16C illustrates a lateral color curve of the camera lens group according to example 8, representing deviations of different image heights on an imaging plane after light passes through the lens assembly. FIG. 16D illustrates a relative illumination curve of the camera lens group according to example 8, representing the relative illumination corresponding to different FOVs. It can be seen from FIG. 16A to FIG. 16D that the camera lens group provided in example 8 can achieve a good imaging quality.

Example 9

A camera lens group according to example 9 of the present disclosure is described below with reference to FIG. 17 to FIG. 18D. FIG. 17 is a schematic structural view of the camera lens group according to example 9 of the present disclosure.

As shown in FIG. 17, the camera lens group according to an exemplary embodiment of the present disclosure includes, sequentially from an object side to an image side along an optical axis, a first lens E1, a second lens E2, a stop STO, a third lens E3, a fourth lens E4, a fifth lens E5, an optical filter E6, a protective glass E7 and an imaging plane S15.

The first lens E1 has a negative refractive power, an object-side surface S1 thereof is convex, and an image-side surface S2 thereof is concave. The second lens E2 has a negative refractive power, an object-side surface S3 thereof is concave, and an image-side surface S4 thereof is concave. The third lens E3 has a positive refractive power, an object-side surface S5 thereof is concave, and an image-side surface S6 thereof is convex. The fourth lens E4 has a positive refractive power, an object-side surface S7 thereof is convex, and an image-side surface S8 thereof is convex. The fifth lens E5 has a negative refractive power, an object-side surface S9 thereof is convex, and an image-side surface S10 thereof is concave. The optical filter E6 has an object-side surface S11 and an image-side surface S12. The protective glass E7 has an object-side surface S13 and an image-side surface S14. Light from the object sequentially passes through the respective surfaces S1 to S14 and is finally imaged on the imaging plane S15.

Optionally, the object-side surface S3 of the second lens E2 has at least one inflection point.

Optionally, at least one of the third lens E3, the fourth lens E4, and the fifth lens E5 located between the stop STO and the imaging plane S15 is glass lens. Among the glass lenses located between the stop STO and the imaging plane S15, a thermal expansion coefficient of the lens closest to the stop STO is TCE=7.1×10$^{-6}$/K at 20° C.

Table 25 shows the surface type, radius of curvature, thickness, material and conic coefficient of each lens of the camera lens group in example 9, wherein the units for the radius of curvature and the thickness are millimeter (mm).

TABLE 25

| Surface No. | Surface Type | Radius of Curvature | Thickness | Material Refractive Index | Abbe Number | Conic coefficient |
|---|---|---|---|---|---|---|
| OBJ | Spherical | Infinite | 2500.0000 | | | |
| S1 | Spherical | 26.8501 | 1.9815 | 1.73 | 54.7 | |
| S2 | Spherical | 6.3856 | 3.8026 | | | |
| S3 | Aspheric | −6.4011 | 3.1189 | 1.53 | 55.8 | −5.2898 |
| S4 | Aspheric | 21.0271 | 2.8231 | | | 64.1935 |
| STO | Spherical | Infinite | 0.3002 | | | |
| S5 | Aspheric | −20.3505 | 2.1005 | 1.62 | 23.5 | 51.9463 |
| S6 | Aspheric | −4.0615 | 0.9393 | | | 0.6513 |
| S7 | Spherical | 8.1494 | 3.8629 | 1.64 | 55.4 | |
| S8 | Spherical | −6.3360 | 0.4847 | | | |
| S9 | Aspheric | 53.5389 | 2.6433 | 1.62 | 23.5 | −93.0351 |
| S10 | Aspheric | 9.8754 | 0.3109 | | | −1.8607 |
| S11 | Spherical | Infinite | 0.5500 | 1.52 | 64.2 | |
| S12 | Spherical | Infinite | 0.0807 | | | |
| S13 | Spherical | Infinite | 0.5000 | 1.52 | 64.2 | |
| S14 | Spherical | Infinite | 0.5013 | | | |
| S15 | Spherical | Infinite | | | | |

As can be seen from Table 25, in example 9, the object-side surface and the image-side surface of the first lens E1 and the fourth lens E4 are spherical, and the object-side surface and the image-side surface of the second lens E2, the third lens E3 and the fifth lens E5 are aspheric. Table 26 shows high-order coefficients applicable to each aspheric surface in example 9, wherein the surface shape of each aspheric surface can be defined by the formula (1) given in the above example 1.

TABLE 26

| Surface No. | A4 | A6 | A8 | A10 | A12 | A14 | A16 |
|---|---|---|---|---|---|---|---|
| S3 | 4.8019E−03 | −2.8948E−04 | 1.4220E−05 | −4.5175E−07 | 8.2506E−09 | −6.4665E−11 | −1.3144E−33 |
| S4 | 9.4138E−03 | 1.5144E−03 | −8.3688E−04 | 2.9209E−04 | −5.8674E−05 | 6.6169E−06 | −3.1001E−07 |
| S5 | −3.3958E−03 | −9.0888E−04 | 5.0408E−04 | −2.8887E−04 | 8.3335E−05 | −1.3157E−05 | 8.0987E−07 |
| S6 | −2.2888E−04 | 2.9539E−05 | −3.5361E−05 | 7.2160E−06 | −8.4803E−07 | 2.3037E−08 | 9.5226E−10 |
| S9 | −7.4950E−03 | 5.2031E−04 | −2.6987E−04 | 6.2959E−05 | −9.2725E−06 | 7.5441E−07 | −2.6198E−08 |
| S10 | −8.3022E−03 | −3.0456E−04 | 9.2044E−05 | −1.4029E−05 | 1.3096E−06 | −6.4807E−08 | 1.2730E−09 |

Table 27 shows a total track length TTL of the camera lens group, a half of a diagonal length ImgH of an effective pixel area on the imaging plane S15, a half of a maximum field of view HFOV, F Number Fno, a total effective focal length f and effective focal lengths f1 to f5 of respective lens in example 1.

TABLE 27

| TTL (mm) | 24.00 | f1 (mm) | −12.17 |
|---|---|---|---|
| ImgH (mm) | 3.15 | f2 (mm) | −8.95 |
| HFOV (°) | 89.0 | f3 (mm) | 7.80 |
| Fno | 1.28 | f4 (mm) | 6.32 |
| f (mm) | 2.06 | f5 (mm) | −20.00 |

Figure 18C:
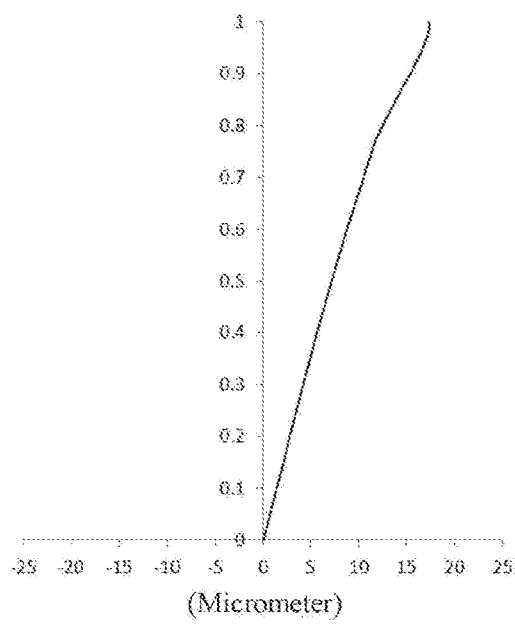
Figure 18D:
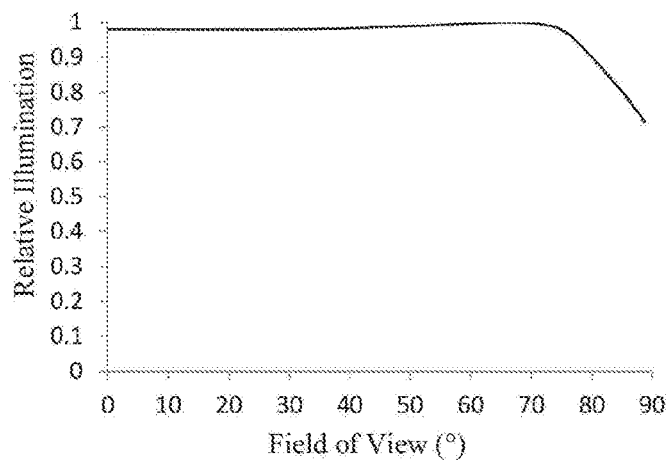

FIG. 18A illustrates a longitudinal aberration curve of the camera lens group according to example 9, representing deviations of focal points converged by light of different wavelengths after passing through the lens assembly. FIG. 18B illustrates an astigmatic curve of the camera lens group according to example 9, representing a curvature of a tangential plane and a curvature of a sagittal plane. FIG. 18C illustrates a lateral color curve of the camera lens group according to example 9, representing deviations of different image heights on an imaging plane after light passes through the lens assembly. FIG. 18D illustrates a relative illumination curve of the camera lens group according to example 9, representing the relative illumination corresponding to different FOVs. It can be seen from FIG. 18A to FIG. 18D that the camera lens group provided in example 9 can achieve a good imaging quality.

In view of the above, examples 1 to 9 respectively satisfy the relationship shown in Table 28.

TABLE 28

| | Example | | | | | | | | |
|---|---|---|---|---|---|---|---|---|---|
| Formula | 1 | 2 | 3 | 4 | 5 | 6 | 7 | 8 | 9 |
| f/f4 | 0.30 | 0.24 | 0.32 | 0.30 | 0.27 | 0.29 | 0.31 | 0.33 | 0.33 |
| f/f1 | −0.16 | −0.16 | −0.28 | −0.16 | −0.10 | −0.40 | −0.24 | −0.13 | −0.17 |
| f1/f2 | 1.91 | 1.63 | 0.67 | 1.87 | 2.79 | 0.36 | 0.85 | 2.39 | 1.36 |
| ImgH × EPD/$f^2_2$ | 1.23 | 1.10 | 1.05 | 1.22 | 1.33 | 1.26 | 1.11 | 1.46 | 1.19 |
| R8/f4 | −1.07 | −1.12 | −1.21 | −1.21 | −1.21 | −1.14 | −1.14 | −0.93 | −1.00 |
| T45 × 10/TTL | 0.89 | 0.86 | 1.01 | 0.80 | 0.95 | 1.08 | 0.87 | — | — |
| CT4/CT5 | 0.99 | 0.74 | 1.44 | 1.02 | 1.18 | 0.75 | 0.88 | 0.70 | 1.46 |
| (T12 + T23 + T45)/TD | 0.44 | 0.45 | 0.42 | 0.41 | 0.51 | 0.38 | 0.39 | 0.32 | 0.34 |
| TCE(×10$^{-6}$/K) | 7.10 | 7.10 | 7.10 | 7.10 | 7.10 | 7.10 | 7.10 | 7.10 | 7.10 |
| DT21/DT52 | 1.45 | 1.45 | 1.02 | 1.38 | 1.55 | 0.80 | 1.14 | 1.52 | 1.49 |
| DT32/DT52 | 0.72 | 0.78 | 0.81 | 0.72 | 0.65 | 0.71 | 0.74 | 0.59 | 0.71 |
| YC21/DT21 | 0.56 | 0.77 | 0.64 | 0.50 | 0.54 | 0.27 | 0.52 | — | 0.62 |
| tan(HFOV/2) | 0.95 | 0.95 | 0.84 | 0.89 | 1.00 | 0.94 | 0.82 | 0.89 | 0.98 |

The present disclosure further provides an imaging apparatus, having a photosensitive element which may be a photosensitive charge-coupled device (CCD) or complementary metal-oxide semiconductor (CMOS). The imaging apparatus may be an independent imaging device such as a digital camera, or may be an imaging module integrated in a mobile electronic device such as a mobile phone. The imaging apparatus is equipped with the camera lens group described above.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A camera lens group, comprising, sequentially from an object side to an image side of the camera lens group along an optical axis, a first lens, a second lens, a third lens, a fourth lens and a fifth lens, wherein:

the first lens has a negative refractive power;

the second lens has a negative refractive power;

the third lens has a refractive power, and an object-side surface of the third lens is concave;

the fourth lens has a positive refractive power, an object-side surface of the fourth lens is convex, and an image-side surface of the fourth lens is convex; and the fifth lens has a refractive power;

the camera lens group further comprises a stop provided between the object side and the third lens, and comprises at least one lens made of glass and located between the stop and the image side, and among the lenses made of glass and located between the stop and the image side, a thermal expansion coefficient TCE of a lens closest to the stop at 20° C. satisfies TCE<15×10$^{-6}$/K, wherein 1<ImgH×EPD/f$^2$<2, where ImgH is a half of a diagonal length of an effective pixel area on an imaging plane of the camera lens group, EPD is an entrance pupil diameter of the camera lens group, and f is a total effective focal length of the camera lens group.

2. The camera lens group according to claim 1, wherein −0.02<f/f4<0.5, where f is a total effective focal length of the camera lens group, and f4 is an effective focal length of the fourth lens.

3. The camera lens group according to claim 1, wherein −0.45<f/f1<0, where f is a total effective focal length of the camera lens group, and f1 is an effective focal length of the first lens.

4. The camera lens group according to claim 1, wherein 0.3<f1/f2<3, where f1 is an effective focal length of the first lens, and f2 is an effective focal length of the second lens.

5. The camera lens group according to claim 1, wherein 0.8<tan(HFOV/2)<1.2, where HFOV is a half of a maximum field of view of the camera lens group.

6. The camera lens group according to claim 1, wherein −2<R8/f4<0, where R8 is a radius of curvature of the image-side surface of the fourth lens, and f4 is an effective focal length of the fourth lens.

7. The camera lens group according to claim 1, wherein 0.5<T45×10/TTL<1.5, where T45 is an interval distance along the optical axis between the fourth lens and the fifth lens, and TTL is a distance along the optical axis from an object-side surface of the first lens to an imaging plane of the camera lens group.

8. The camera lens group according to claim 1, wherein 0.5<CT4/CT5<1.5, where CT4 is a center thickness along the optical axis of the fourth lens, and CT5 is a center thickness along the optical axis of the fifth lens.

9. The camera lens group according to claim 1, wherein 0<(T12+T23+T45)/TD<0.6, where T12 is an interval distance along the optical axis between the first lens and the second lens, T23 is an interval distance along the optical axis between the second lens and the third lens, T45 is an interval distance along the optical axis between the fourth lens and the fifth lens, and TD is a distance along the optical axis from the object-side surface of the first lens to an image-side surface of the fifth lens.

10. The camera lens group according to claim 1, wherein 0.8≤DT21/DT52<1.6, where DT21 is a maximum effective radius of an object-side surface of the second lens, and DT52 is a maximum effective radius of an image-side surface of the fifth lens.

11. The camera lens group according to claim 1, wherein 0.5<DT32/DT52<1, where DT32 is a maximum effective radius of an image-side surface of the third lens, and DT52 is the maximum effective radius of the image-side surface of the fifth lens.

12. A camera lens group, comprising, sequentially from an object side to an image side of the camera lens group along an optical axis, a first lens, a second lens, a third lens, a fourth lens and a fifth lens, wherein:

the first lens has a negative refractive power;

the second lens has a negative refractive power;

the third lens has a refractive power, and an object-side surface of the third lens is concave;

the fourth lens has a positive refractive power, an object-side surface of the fourth lens is convex, and an image-side surface of the fourth lens is convex; and the fifth lens has a refractive power;

an object-side surface of the second lens has at least one inflection point, and 0.2<YC21/DT21<1, where YC21 is a vertical distance from a critical point on the object-side surface of the second lens to the optical axis, and DT21 is a maximum effective radius of the object-side surface of the second lens.

13. The camera lens group according to claim 12, wherein −0.02<f/f4<0.5, where f is a total effective focal length of the camera lens group, and f4 is an effective focal length of the fourth lens.

14. The camera lens group according to claim 12, wherein −0.45<f/f1<0, where f is a total effective focal length of the camera lens group, and f1 is an effective focal length of the first lens.

15. The camera lens group according to claim 12, wherein 0.5<T45×10/TTL<1.5, where T45 is an interval distance along the optical axis between the fourth lens and the fifth lens, and TTL is a distance along the optical axis from an object-side surface of the first lens to an imaging plane of the camera lens group.

16. The camera lens group according to claim 12, wherein 0.5<CT4/CT5<1.5, where CT4 is a center thickness along the optical axis of the fourth lens, and CT5 is a center thickness along the optical axis of the fifth lens.

17. The camera lens group according to claim 12, wherein 0.8≤DT21/DT52<1.6, where DT21 is the maximum effective radius of the object-side surface of the second lens, and DT52 is a maximum effective radius of an image-side surface of the fifth lens.

18. The camera lens group according to claim 12, wherein 0.5<DT32/DT52<1, where DT32 is a maximum effective radius of an image-side surface of the third lens, and DT52 is the maximum effective radius of the image-side surface of the fifth lens.

19. The camera lens group according to claim 12, wherein 1<ImgH×EPD/f$^2$<2, where ImgH is a half of a diagonal length of an effective pixel area on an imaging plane of the camera lens group, EPD is an entrance pupil diameter of the camera lens group, and f is a total effective focal length of the camera lens group.

* * * * *